United States Patent [19]

Matsuda

[11] Patent Number: 5,019,912
[45] Date of Patent: May 28, 1991

[54] IMAGING DEVICE CAPABLE OF PICKING UP ELECTRICALLY ENLARGED IMAGES

[75] Inventor: Noboru Matsuda, Yaita, Japan

[73] Assignee: Sharp Kabushiki Kaisha, Osaka, Japan

[21] Appl. No.: 331,735

[22] Filed: Mar. 31, 1989

[30] Foreign Application Priority Data

Apr. 1, 1988 [JP] Japan .................................. 63-81832
Apr. 1, 1988 [JP] Japan .................................. 63-81833

[51] Int. Cl.$^5$ .............................................. H04N 3/14
[52] U.S. Cl. .............................. 358/213.26; 358/909; 358/213.27
[58] Field of Search ................... 358/213.26, 213.22, 358/213.29, 225, 909, 213.27

[56] References Cited

U.S. PATENT DOCUMENTS 4,442,457  4/1984  Pines ............................... 358/213.26
4,652,524  4/1987  Norris et al. .................... 358/909
4,831,451  5/1989  Hynecek ........................ 358/213.26
4,876,601  10/1989 Hashimoto et al. ........... 358/213.26

Primary Examiner—Charles A. Ruehl
Assistant Examiner—J. Jackson

[57] ABSTRACT

An image pickup device is capable of picking up images while electrically enlarging the same. In enlarging image pickup, horizontal transfer pulses $H_1$, $H_2$, a reset pulse R, a clock signal CLK, sampling pulses $SP_1$, $SP_2$ and so on having the periods twice as long as those in the normal image pickup are generated from a horizontal transferring circuit in a timing pulse generating circuit. Thereby, charges stored in a CCD image sensor (6) are horizontally transferred by these signals. A vertical transfer circuit sets vertical transfer pulses $V_1$ to $V_4$ at arbitrary timings during 1H of a video period to output the same once in every 2H and outputs high speed vertical transfer pulses in two periods in a vertical blanking period and outputs a reading pulse TG between the first high speed vertical transfer period and the next high speed vertical transfer period. The charges stored in the CCD image sensor are then transferred in the vertical direction in response to these signals. Consequently, a selected area of the screen of the normal image pickup can be enlarged and picked up.

9 Claims, 18 Drawing Sheets

FIG.4  PRIOR ART
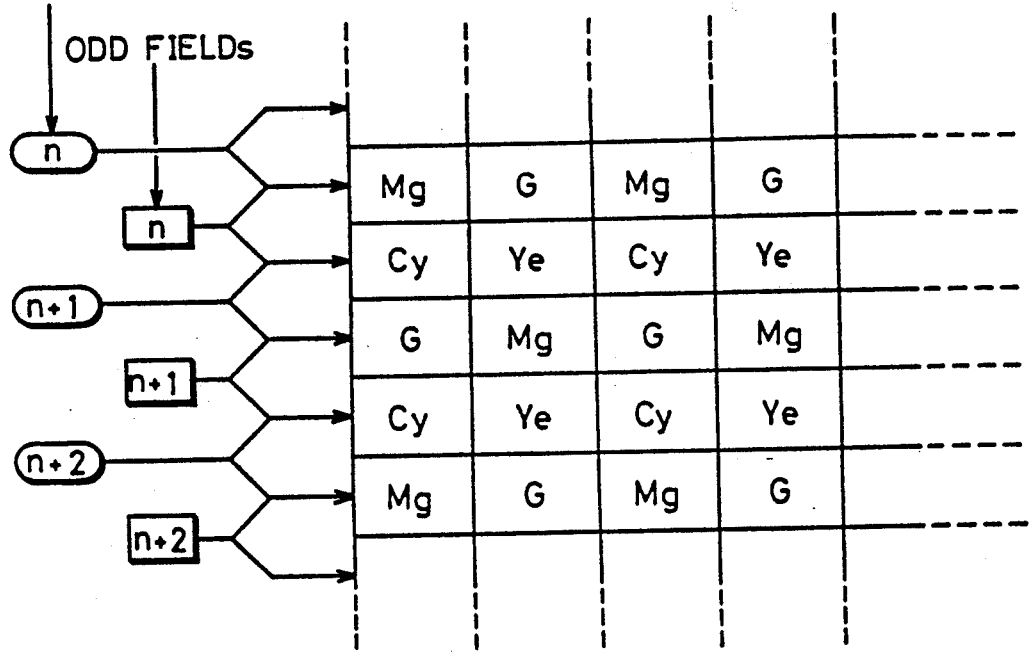
FIG.5  PRIOR ART
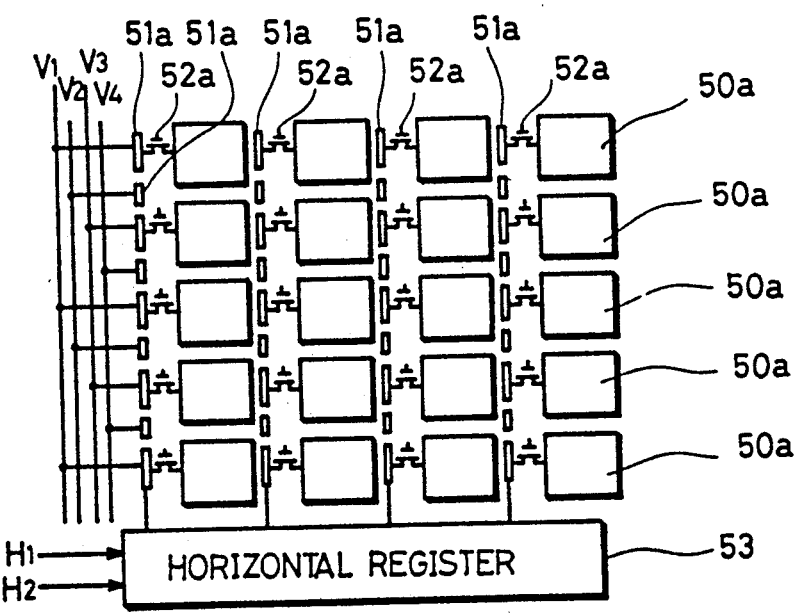
FIG. 5A  PRIOR ART    FIG. 5B  PRIOR ART
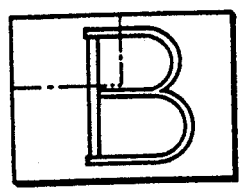 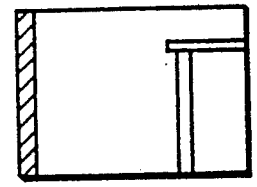

IMAGING DEVICE CAPABLE OF PICKING UP ELECTRICALLY ENLARGED IMAGES

BACKGROUND OF THE INVENTION

1. Field of the Invention

The present invention relates to an imaging device capable of picking up images while electrically enlarging the same. More specifically, the present invention relates to an imaging device used for a video camera, a video tape recorder incorporating a camera and so on which is capable of picking up images subsequently electronically enlarged by using a solid state imaging device such as a CCD (Charge Coupled Device).

2. Description of the Related Art

FIG. 1 is a schematic block diagram showing a conventional imaging device capable of picking up images which are subsequently electrically enlarged. FIG. 2 is a block diagram showing a selector for vertical transfer pulses shown in FIG. 1. FIG. 3 is a schematic block diagram of each of other selectors.

A structure of a conventional imaging device will be described with reference to FIGS. 1 to 3. A timing pulse generating circuit 31 is provided for generating various timing pulses for driving a CCD image sensor 36. A reference clock signal $2F_{CK}$ having a frequency of $2F_{CK}$ is applied to the timing pulse generating circuit 31 from a crystal oscillating circuit 40. The crystal oscillating circuit 40 includes a crystal oscillator X, resistances $R_1$ and $R_2$, capacitors $C_1$ and $C_2$ and an inverter, not shown, in the timing pulse generating circuit. A horizontal driving pulse HD and a vertical driving pulse VD are applied to the timing pulse generating circuit 31 from a synchronizing signal generating circuit (SSG), not shown. The timing pulse generating circuit 31 outputs vertical transfer pulses $V_1$ to $V_4$, horizontal transfer pulses $H_1$ and $H_2$, a reset pulse R, a clock pulse CLK, sampling pulses $SP_1$ and $SP_2$, a $F_H/2$ pulse and a reading pulse TG in response to the reference clock signal $2F_{CK}$, the horizontal driving pulse HD and the vertical driving pulse VD. The vertical transfer pulses $V_1$ to $V_4$ and the $F_H/2$ pulse are applied to a selector 32 for vertical transfer pulses.

The selector 32 for the vertical transfer pulses is provided for switching vertical transfer pulses in normal image pickup and an enlarged image pickup. A select signal is inputted to the selector 32 for this purpose. The select signal becomes low "L" level in normal image pickup while it becomes high "H" level in enlarged image pickup. More specifically, the selector 32 for the vertical transfer pulses includes two selectors 32a and 32b, as shown in FIG. 2. When the select signal becomes "L" level during normal image pickup, inputs A are selected at respective outputs Y of the selectors 32a and 32b. When the select signal becomes "H" level during enlarged image pickup, inputs B are selected for respective outputs Y. Therefore, in normal image pickup, the A input is selected for the Y output of the selector 32a to be "L". Further, by this "L" level signal, the A input is also selected for the Y output of the selector 32b, thereby providing the vertical transfer pulse.

Meanwhile, for the enlarged image pickup, B input is selected for the output of the selector 32a to provide the $F_H/2$ pulse. The $F_H/2$ pulse has a period of 2H (H: one horizontal scanning period) which alternately becomes "L" level and "H" level at every 1H. Therefore, the A input and the B input ("H" level signal or "L" level signal) are switched at every 1H for the Y output of the selector 32b. Consequently, vertical transfer pulses are outputted at every 2H.

The horizontal transfer pulses $H_1$ and $H_2$ and the reset pulse R generated from the timing pulse generating circuit 31 are applied to a selector 34 for the horizontal transfer pulses and for the reset pulse. The clock pulse CLK generated from the timing pulse generating circuit 31 is applied to a selector 38 for the clock pulse CLK and the sampling pulses $SP_1$ and $SP_2$ are applied to a selector 39 for color separating pulses. Select signals are respectively inputted to the selector 34 for the horizontal transfer pulse and for the reset pulse, the selector 38 for the clock and to the selector 39 for the color separating pulse.

Each of the selector 34 for the horizontal transfer pulse and the reset pulse, the selector 38 for clocks and the selector 39 for the color separation pulse includes a ½ divider 41 and a selector 42, as shown in FIG. 3. In the normal image pickup, the selector 42 selects A input to output the same at the output Y, whereby respective pulses are directly outputted. Meanwhile, in the enlarged image pickup, the selector 42 selects the B input to output the same at the output Y, whereby a pulse signal provided by dividing the input pulse by the ½ divider 41 is outputted. Consequently, horizontal transfer is carried in a period which is doubled as compared with the normal image pickup, and the vertical transfer is carried out once in every 2H. Therefore, a signal is outputted in which a ¼ region in a corner of the display screen is enlarged twice (fourfold in the area).

The vertical transfer pulses $V_1$ to $V_4$ outputted from the selector 32 for the vertical transfer pulses and the reading pulse TG generated from the timing pulse generating circuit 31 are applied to a vertical transfer driver 33 to be inverted and mixed. Further driving signals $\phi V_1$ to $\phi V_4$ are applied to a CCD image sensor 36. The horizontal transfer pulses $H_1$, $H_2$ and the reset pulse R selected in the selector 34 for the horizontal transfer pulses and for the reset pulse are amplified by a horizontal transferring and resetting driver 35 to be applied to the CCD image sensor as driving signals $\phi H_1$, $\phi H_2$ and $\phi R$.

The CCD image sensor 36 includes a plurality of photodiodes serving as light receiving elements arranged in the horizontal and vertical directions as shown in FIG. The sensor applies image signals VO of the picked up images to a S/H circuit 37. A clock signal selected by a selector 38 for the clock is applied to the S/H circuit 37. Since the output signal VO from the CCD image sensor 36 includes not only a signal component but also a clock component including reset component and a field through component, the S/H circuit 37 is provided for separating and extracting a signal component having less low frequency distortion and superior S/N. This is achieved by clamping the field through component and thereafter by sampling and holding the signal component.

The signal component of the output signal VO from the CCD image sensor 36 has negative polarity, which is inverted by the S/H circuit 37. Whereby a signal having positive polarity is outputted as a precut to be applied to a signal processing circuit, not shown. A selector 39 for color separating pulses applies sampling pulses $SP_1$ and $SP_2$ outputted in response to a select signal to the signal processing circuit.

FIG. 4 shows an arrangement of complementary color filters provided on a CCD image sensor, and FIG. 5 shows a structure of the CCD image sensor.

Complementary color filters such as shown in FIG. 4 are arranged on the CCD image sensor 36 shown in FIG. 1, and photodiodes 50a are provided corresponding to the colors of the complementary color filters. Namely, a plurality of photodiodes 50a, 50a ... are arranged in horizontal and vertical directions to form a matrix. Vertical registers 51a, 51a ... and reading gates 52a, 52a ... are provided corresponding to the photodiodes 50a, 50a ..., and the vertical transfer pulses $V_1$ to $V_4$ are alternately applied to the respective vertical registers 51, 51 .... Charges stored in adjacent photodiodes in the vertical direction, for example in the photodiode 50a corresponding the vertical transfer pulse $V_1$ and in the corresponding to the vertical transfer pulse $V_1$ and in the photodiode 50a corresponding to the vertical transfer pulse $V_3$, are mixed to provide charges of 1 pixel in a horizontal line.

A reading pulse TG is applied to the reading gate 52a coupling the photodiode 50a and the vertical register 51a. The charges stored in the photodiode 50a are read to the vertical register 51a in response to the reading pulse TG. The charges read to the vertical registers 51a are successively transferred to the horizontal register 53. Horizontal transfer pulses $H_1$ and $H_2$ are applied to the horizontal register 53 and the horizontal register 53 transfers image signals of 1 line in response to the horizontal transfer pulses $H_1$ and $H_2$. The combination of the photodiodes 50a in reading are different in odd fields and even fields by 0.5 horizontal line, as shown in FIG. 4, thereby realizing interlace.

FIG. 6 is a diagram of waveforms showing timings of the pulses in association with the horizontal transfer. FIG. 7 is a diagram of waveforms showing the timings of the pulses in association with the vertical transfer near the vertical blanking period in normal image pickup. FIG. 8 is a diagram of waveforms showing timings of the pulses in association with the vertical transfer near the vertical blanking period in enlarging image pickup. FIG. 9 is a diagram of waveforms showing the timings near the HD in normal image pickup. FIG. 10 is a diagram of waveforms showing timings near HD in enlarging image pickup.

The relationship between various timings in a conventional image pickup device will be described in the following with reference to FIGS. 1 to 10. As shown in FIG. 6, the pulses in association with the horizontal transfer include horizontal transfer pulses $H_1$, $H_2$, the reset pulse R, the clock signal CLK, the clamping pulse CDS, the sample and holding pulse S/H and the sampling pulses $SP_1$ and $SP_2$. The clamping pulse CDS is provided in synchronization with the rise of the clock signal CLK in the S/H circuit 37 shown in FIG. 1. The sample and holding pulse S/H is provided in synchronization with the fall of the clock signal CLK. The period of the horizontal transfer pulse $H_1$ corresponds to the period of 1 pixel in the horizontal direction of the CCD image sensor 36.

The output signal VO from the CCD image sensor 36 includes not only the signal component but also the clock component including the reset component and the field through component as shown in FIG. 6(d). However, the field through component is clamped and the signal component is sampled and held by the S/H circuit 37, so that the signal component having less low frequency distortion and superior S/N can be separated and extracted. Since the signal component of the output signal VO has negative polarity, the polarity is inverted by an inverting amplifier included in the S/H circuit 37 to be provided as a signal having positive polarity.

When images are to be picked up are enlarged twice, the periods of the pulses in association with the horizontal transfer are doubled as compared in the normal image pickup, by respective selectors 34, 38 and 39. Consequently, information of horizontal 1 line is read in a time period of 2H. Therefore, it will be a signal doubled in the horizontal direction when viewed in 1H.

The pulses in association with the vertical transfer will be described in the following. The $F_{CK}$ signal generated from the timing pulse generating circuit 31 is applied to a synchronizing signal generating circuit. By dividing the $F_{CK}$ signal in the synchronizing signal generating circuit, a vertical driving pulse VD and a horizontal driving pulse HD are provided. In normal image pickup, vertical transfer is carried out once in every 1H by the vertical transfer pulses $V_1$ to $V_4$ ($V_2$ to $V_4$ are not shown) shown in FIG. 7(c) in synchronization with the horizontal driving pulse HD shown in FIG. 7(b) during the vertical blanking period shown in FIG. 7(a). Reading is also carried out once in every 1V (one vertical scanning period) by the reading pulse TG during the vertical blanking.

Meanwhile, in the twice enlarging image pickup, vertical transfer is carried out once in every 2H by the vertical transfer pulses $V_1$ to $V_4$ ($V_2$ to $V_4$ are not shown) of FIG. 8(c). Namely, information of the horizontal lines is read in 2V, so that signals enlarged twice in the vertical direction are provided when viewed 1V.

In the normal image pickup, the horizontal transfer pulses $H_1$ and $H_2$ have a rest period, as shown in FIGS. 9(b) and (c), during which period vertical transfer is carried out by the vertical transfer pulses $V_1$ to $V_4$. An optical black clamp pulse OBCP shown in FIG. 9(d) is outputted from the synchronizing signal generating circuit and applied to an optical black clamping circuit in a signal processing circuit, not shown. The optical black clamp pulse corresponds to the final 30 pixels or so of the horizontal pixels, so that clamping is carried out for these pixels by the optical black clamp pulse OBCP to provide the black reference level (pedestal level) in signal processing.

The video signals will subsequently be described. In the horizontal component of a video signal, signals of 1H out of the signals of 2H in enlarging image pickup are unnecessary. Signals of 1V out of 2V signals are also unnecessary in the vertical component. Therefore, as for the horizontal component, the time in which the unnecessary signal component is to be outputted is interpolated with signals delayed by 1H by a 1H delay circuit and an analog switch and the like, to provide continuous signals. As for the vertical component, the charges of the unnecessary signals are vertically transferred at high speed during the vertical blanking period, by a high speed vertical transfer pulse such as shown in FIG. 8(c) interposed in the vertical transfer pulse, to eliminate the unnecessary signal component. Now, the high speed vertical transfer in this case means successive vertical transfer in the reverse direction, by which unnecessary charges are discharged to an overflow drain (not shown) provided in the CCD image sensor 36. This is a popular method used to discharge unnecessary charges in a high speed electrical shutter.

FIG. 11 is a diagram of waveforms showing timings of the vertical transfer pulses for transferring charges in the CCD in the forward direction and, FIG. 12 is a diagram of waveforms showing timings of the vertical transfer pulses for transferring in the reverse direction.

The operation of the CCD image sensor 36 will be described in the following. Charges are stored in the vertical registers 51a shown in FIG. 5 while the vertical transfer pulses $V_1$ to $F_4$ are at the "L" level. In the diagram of waveforms of FIG. 11, charges are stored in the vertical registers 51 which are below these electrodes to which the vertical transfer pulses $V_2$ and $V_3$ are applied, at first. The "L" level portion of the vertical transfer pulses $V_1$ to $V_4$ moves in the order of $[V_2, V_3] \to [V_2, V_3, V_4] \to [V_3, V_4] \to [V_3, V_4, V_1] \to [V_4, V_1] \to [V_4, V_1, V_2] \to [V_1, V_2] \to [V_1, V_2, V_3] \to [V_2, V_3]$, whereby forward transfer of horizontal 1 line is completed. In the example shown in FIG. 12, the "L" level portion of the vertical transfer pulses $V_1$ to $V_4$ moves in the order of $[V_2, V_3] \to [V_1, V_2, V_3] \to [V_1, V_2] \to [V_4, V_1, V_2] \to [V_4, V_1] \to [V_3, V_4, V_1] \to [V_3, V_4] \to [V_2, V_3, V_4] \to [V_2, V_3]$, whereby reversal transfer of horizontal 1 line is completed. The twice enlarging image pickup in both horizontal and vertical directions can be carried out by the above described method. FIG. 13 is a diagram of waveforms showing reading timings of odd fields. FIG. 14 is a diagram of waveforms showing reading timings of even fields.

Referring to FIG. 13, in the odd fields, the charges stored in the photodiodes 50a corresponding to the vertical transfer pulse $V_3$ are read by setting the reading pulse TG at the "L" level to be stored in the vertical registers 51a below those electrodes to which the vertical transfer pulses $V_2$ and $V_3$ are applied. Thereafter, the "L" level portion moves in the order of $[V_2, V_3] \to [V_1, V_2, V_3] \to [V_1, V_2] \to [V_4, V_1, V_2] \to [V_4, V_1]$, whereby reverse transfer of a horizontal 0.5 line is carried out. Subsequently, the charges read from the photodiodes 50a corresponding to the vertical transfer pulse $V_3$ are stored in the vertical registers 51a below those electrodes to which the vertical transfer pulses $V_4$ and $V_1$ are applied. Thereafter, charges stored in the photodiodes 50a corresponding to the vertical transfer pulse $V_1$ are read in the similar manner, to be stored in the vertical registers 51a below those electrodes to which the vertical transfer pulses $V_4$ and $V_1$ are applied. Consequently, the charges read from the photodiodes 50a corresponding to the vertical transfer pulse $V_1$ are mixed with the charges read from the photodiodes 50a corresponding to the vertical transfer pulse $V_3$.

Thereafter, the "L" level portion of the vertical transfer pulses $V_1$ to $V_4$ moves in the order of $[V_4, V_1][V_4, V_1, V_2] \to [V_1, V_2] \to [V_1, V_2, V_3] \to [V_2, V_3]$, whereby a forward transfer of horizontal 0.5 line is carried out. Consequently, the charges read from the photodiodes 50a corresponding to the vertical transfer pulses $V_1$ and $V_3$ are stored in the vertical registers 51a below these electrodes to which the vertical transfer pulses $V_2$ and $V_3$ are applied.

Referring to FIG. 14, in the even fields, the charges read from the photodiodes corresponding to the vertical transfer pulses $V_3$ are stored in the vertical registers 51a below these electrodes to which the vertical transfer pulses $V_4$ and $V_1$ are applied by the forward transfer of horizontal 0.5 line in the order of $[V_2, V_3] \to [V_2, V_3, V_4] \to [V_3, V_4] \to [V_3, V_4, V_1] \to [V_4, V_1]$. Thereafter, the charges read from the photodiodes 50a corresponding to the vertical transfer pulse $V_1$ are mixed with the charges read from the photodiodes 50a corresponding to the vertical transfer pulse $V_3$. The charges read from the photodiodes 50a corresponding to the vertical transfer pulses $V_3$ and $V_1$ are stored in the vertical registers 51a below those electrodes to which the vertical transfer pulses $V_2$ and $V_3$ are applied by the reversal transfer of horizontal 0.5 line in the order of $[V_4, V_1] \to [V_3, V_4, V_1] \to [V_3, V_4] \to [V_2, V_3, V_4] \to [V_2, V_3]$ controlling the timings during reading. The combination of the photodiodes 50a in the odd fields and the even fields is shifted by 0.5 line, as the photodiodes 50a corresponding to the vertical transfer pulses $V_1$ and $V_3$ are selected for the odd fields and the photodiodes 50a corresponding to the vertical transfer pulses $V_3$ and $V_1$ are selected for the even fields, thereby realizing interlacing.

However, the above described conventional image pickup device exhibits the following drawbacks. Namely, the electrically enlarging function is to enlarge a ¼ area at a corner of the screen by two times (fourfold in area). Therefore, enlargement of a central portion cannot be carried out, as compared with a case of optical enlargement. Therefore, it is not very good especially when an image enlarged by optical zooming is further enlarged by this method. Further, when a ¼ area in the upper left corner of the screen as shown in FIG. 5A is enlarged twice, the rest period of the horizontal transfer becomes longer and a hatched region appears on the left side of the screen as shown in FIG. 5B.

In the enlarging image pickup, signals interpolated by the 1H delay circuit or the like are used. Therefore, the same signals are provided for the horizontal 2 lines as the luminance signals, for example. Consequently, when the combination of the photodiodes is changed in the odd fields and the even fields, sometimes an extra horizontal line of even or odd field appears dependent on the video signals, causing jitters between fields. As a result, the images are not very nice to look at.

If the timing of a select signal for switching between the normal image pickup and the enlarging image pickup is not proper, the switching may possibly be carried out at an intermediate portion of the video signals. This causes disturbance of the video signals and therefore the resulting images will be not nice to look at.

SUMMARY OF THE INVENTION

Therefore, one object of the present invention is to provide an image pickup device capable of picking up images while electrically enlarging the same, in which an arbitrary area on a screen for normal image pickup can be enlarged by n times.

Another object of the present invention is to provide an image pickup device capable of picking up images while electrically enlarging the same, in which unnecessary images do not appear on the screen when images are picked up and enlarged by n times.

A further object of the present invention is to provide an image pickup device capable of picking up images while electrically enlarging the same, in which disturbance of displayed images can be eliminated by switching between the normal image pickup and the enlarging image pickup in synchronization with signals in association with vertical synchronization.

Briefly stated, in the present invention, a plurality of light receiving elements are arranged in horizontal and vertical directions in a solid state imaging device, outputs from the light receiving elements arranged in the horizontal direction are transferred in the vertical direction during a horizontal blanking period, the outputs of the light receiving elements in the horizontal direction transferred in the vertical direction are transferred in the horizontal direction during a horizontal scanning period. A reference pulse signals is generated from reference pulse signal generating device, and when an instructing signal for picking up images while enlarging the images by n times is outputted from an instructing device, the horizontal transfer pulse generating device outputs, in synchronization with the pulse signal generated from the reference pulse signal generating device, pulses in association with the horizontal transfer having the periods n times as long as that in the normal image pickup for transferring outputs of the light receiving elements in the horizontal direction.

Upon reception of an instruction from the instructing device, the vertical transfer pulse generating device counts pulse signals generated from the reference pulse signal generating device in response to a horizontal synchronizing signal and outputs, once in every n horizontal scanning periods, a pulse in association with the vertical transfer for transferring the outputs of the light receiving elements in the vertical direction. Further the timing of outputting the pulse can be arbitrarily selected during one horizontal scanning period. A high speed vertical transfer pulse generating device generates high speed vertical transfer pulses in two predetermined sections during the vertical blanking period for transferring unnecessary outputs resulting from the n time enlargement out of the outputs of the light receiving elements in the vertical direction for a predetermined number of times in the vertical direction at high speed. Then the high speed vertical transfer pulses are interposed between the vertical transfer pulses. A reading pulse generating means generates reading pulses for reading image signals from the solid state imaging device during predetermined two time periods in the vertical blanking period, in synchronization with the horizontal synchronizing signal.

Therefore, in accordance with the present invention, the vertical transfer pulse is outputted once in every n. horizontal scanning periods at a selected arbitrary timing in one horizontal scanning period, so that a selected arbitrary area of the screen for normal image pickup can enlarged by n times.

In accordance with the preferred embodiment of the present invention, the instructing device generates an instructing signal for picking up images with the images enlarged by n times in synchronization with a vertical synchronizing signal generated from synchronizing signal generating device.

Therefore, in accordance with a further preferred embodiment of the present invention, the switching between the normal image pickup and the enlarging image pickup is carried out in synchronization with the vertical synchronizing signal. Thus, the disturbance in the displayed images can be eliminated.

In a further preferred embodiment of the present invention, a selected arbitrary portion which is to be enlarged out of the images picked up by the solid state imaging device is designated. Then representing the horizontal position and the vertical position of the designated portion to be enlarged are outputted. The timing of generation of the pulses in association with the vertical transfer is then defined in response to the horizontal data. Finally, the number of transfer of high speed vertical transfer is set in response to the vertical data. At the same time, the data representing the enlarged portion are displayed on the display device.

Therefore, in accordance with the further preferred embodiment of the present invention, the enlarging area on the display screen can be arbitrarily changed, subsequently the changed enlarging area can be displayed by the display device, such as an electronic view finder. This thereby provides a trimming function which can be readily operated.

The foregoing and other objects, features, aspects and advantages of the present invention will become more readily apparent from the following detailed description of the present invention when taken in conjunction with the accompanying drawings.

BRIEF DESCRIPTION OF THE DRAWINGS

FIG. 4 shows an arrangement of complementary color filters provided on a CCD image sensor;

FIG. 5 shows a structure of the CCD image sensor;

FIG. 5A shows images in normal image pickup and FIG. 5B shows images in enlarging image pickup;

DESCRIPTION OF THE PREFERRED EMBODIMENTS

Figure 15:
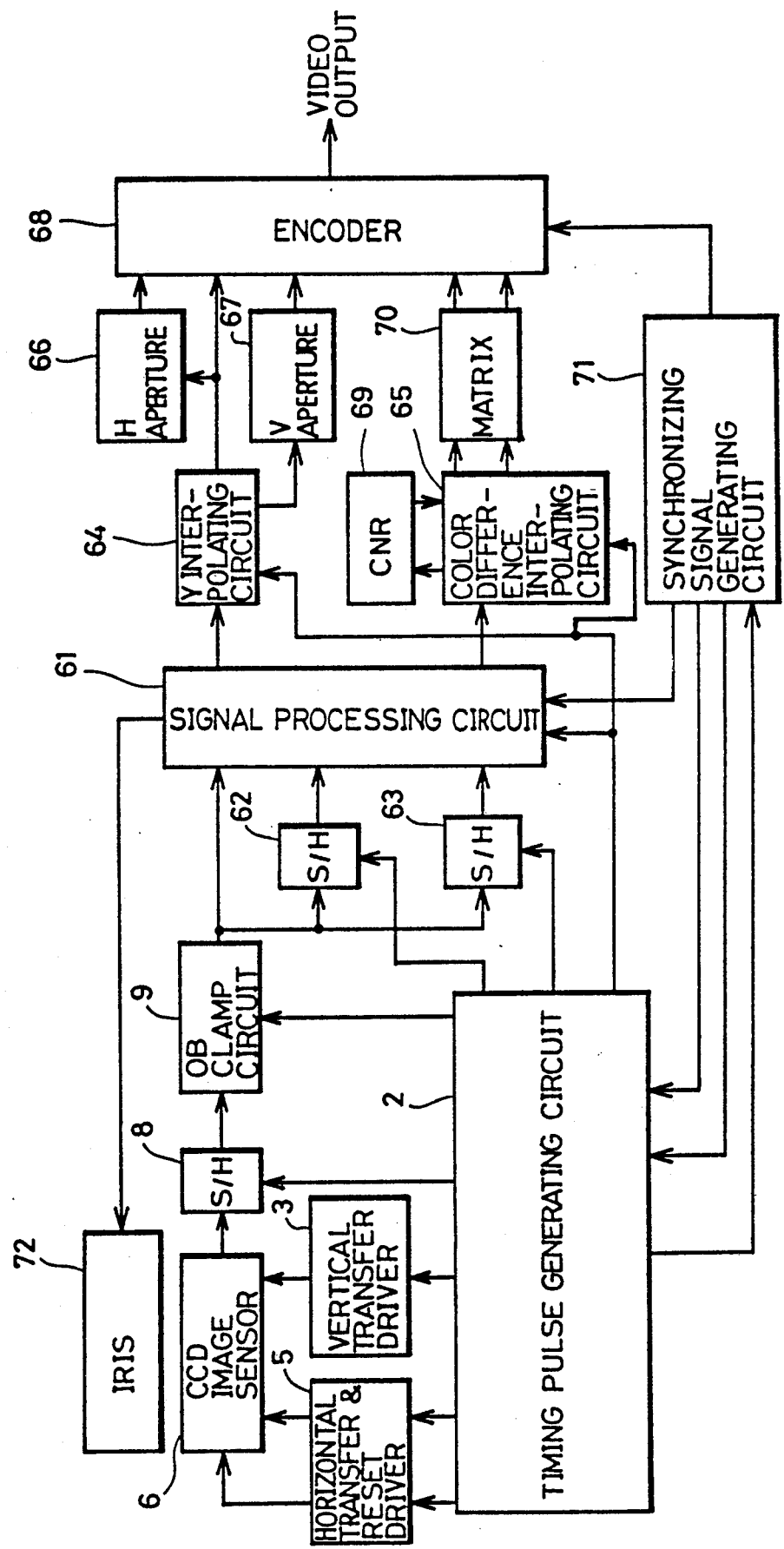
FIG. 15 is a schematic block diagram showing a whole structure of one embodiment of the present invention.

FIG. 15 is a schematic block diagram showing the whole structure of one embodiment of the present invention. Referring to FIG. 15, the structure of the image pickup device will be described. A timing pulse generating circuit 2, which will be described in detail with reference to FIGS. 16 and 17, generates horizontal transfer pulses $H_1$, $H_2$, vertical transfer pulses $V_1$ to $V_4$, a reset pulse R, a clock pulse CLK, sampling pulses $SP_1$, $SP_2$ and a reading pulse TG. The horizontal transfer pulses $H_1$, $H_2$ and the reset pulse R are applied to a CCD image sensor 6 through a horizontal transfer and reset driver 5. The vertical transfer pulses $V_1$ to $V_4$ and the reading pulse TG are applied to the CCD image sensor through a vertical transfer driver 3. The CCD image sensor 6 outputs image signals of the picked up images to apply the same to a S/H circuit 8.

Figure 1:
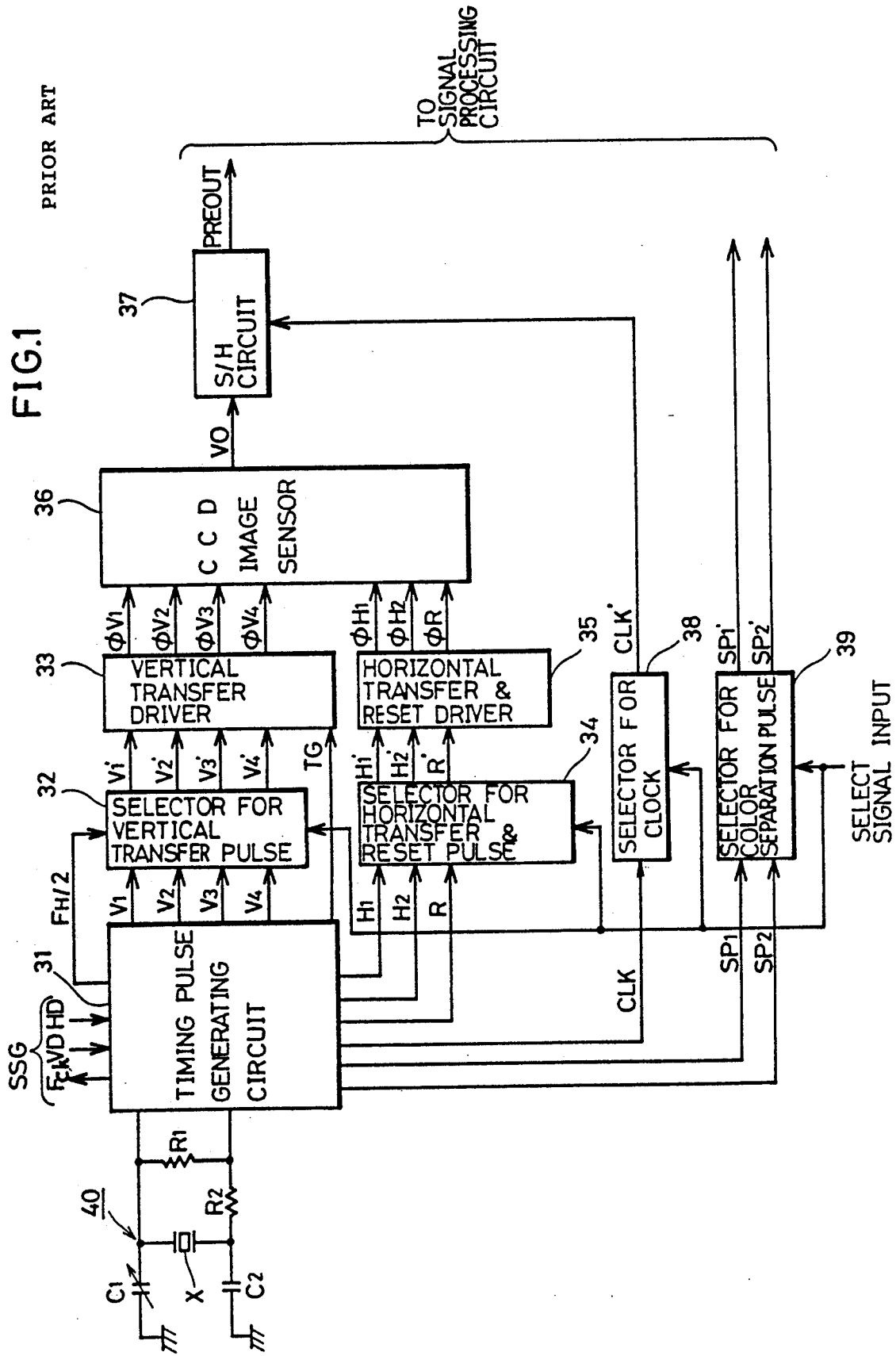
FIG. 1 is a schematic block diagram showing a conventional image pickup device capable of picking up images while electrically enlarging the same.
Figure 2:
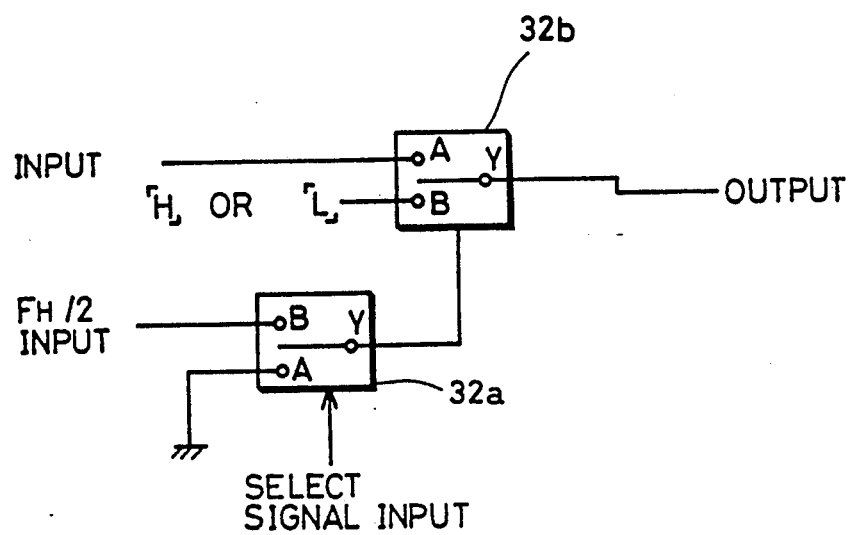
FIG. 2 is a block diagram showing a selector for vertical transfer pulses shown in FIG. 1.
Figure 3:
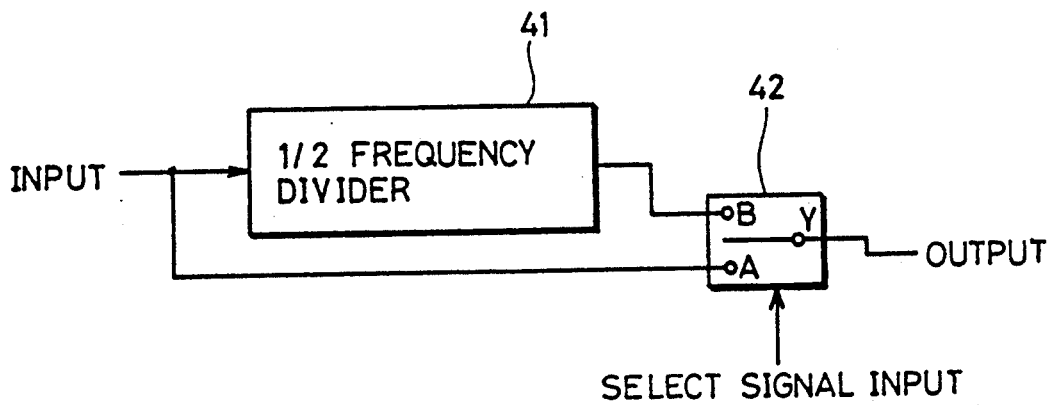
FIG. 3 is a schematic block diagram showing each of the other selectors.

The S/H circuit 8 samples and holds image signals in response to the clock signal CLK applied from the timing pulse generating circuit 2, and operates in the similar manner as the S/H circuit 37 shown in FIG. 1. The sample and held image signals are applied to an OB clamp circuit 9. The OB clamp circuit 9 clamps an optical black portion in response to an optical black clamping pulse OBCP applied from the timing circuit 2. The clamped image signals are applied to a signal processing circuit 61 and the sample and hold circuits 62 and 63. The sample and hold circuits 62 and 63 separate color signals in response to sampling pulses $SP_1$ and $SP_2$ supplied from the timing pulse generating circuit 2, and applies the separated color signals to the signal processing circuit 61. The signal processing circuit 61 is provided for carrying out signal processing such as AGC, $\gamma$ correction, white balance, KNEE, ALC and so on. An iris 72 adjusts an amount of light entering the CCD image sensor 6 in response to a control signal from the signal processing circuit 61.

The signal processing circuit 61 extracts luminance signals from the image signals and applies the same to a Y interpolating circuit 64. The Y interpolating circuit 64 is provided for the interpolation of the luminance signals. Outputs from the Y interpolating circuit 64 are applied to an encoder 68 as well as to an H aperture circuit 66 to correct outlines in the horizontal direction. They are further applied to a V aperture circuit 67 to correct outlines in the vertical direction. Outputs from the H aperture circuit 66 and from the V aperture circuit 67 are applied to the encoder 68. Color signals outputted from the signal processing circuit 61 are applied to a color difference interpolating circuit to interpolate color difference signals. A CNR circuit 69 is provided in association with the color difference interpolating circuit 65 and random noises included in the color difference signal are supplied by the CNR 69. Color difference signals R-Y and D-Y outputted from the color difference interpolating circuit 65 are applied to the encoder 68 through a matrix 70. The encoder 68 outputs video signals in response to the illuminance signals and the color signals. A synchronizing signal generating circuit 71 applies horizontal driving pulses HD and vertical driving pulses VD to the timing pulse generating circuit 2, applies clamp pulses and blanking signals to the signal processing circuit 61 and applies other necessary signals to the encoder 68, in response to the clock signal $F_{CK}$ provided from the CK timing pulse generating circuit 2.

Figure 16:
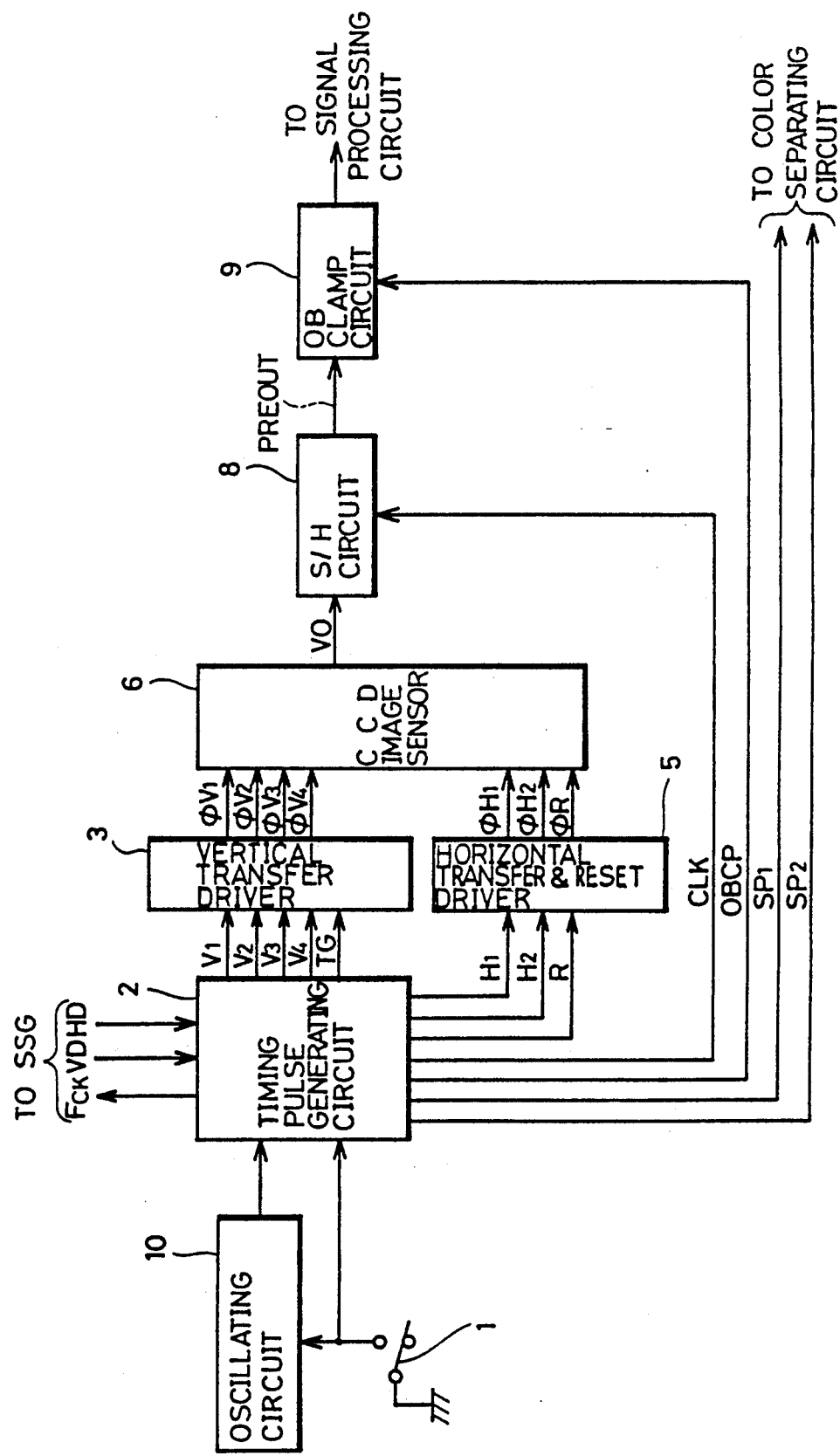
FIG. 16 is a schematic block diagram showing the timing pulse generating circuit and the peripheral portions thereof shown in FIG. 15.
Figure 17:
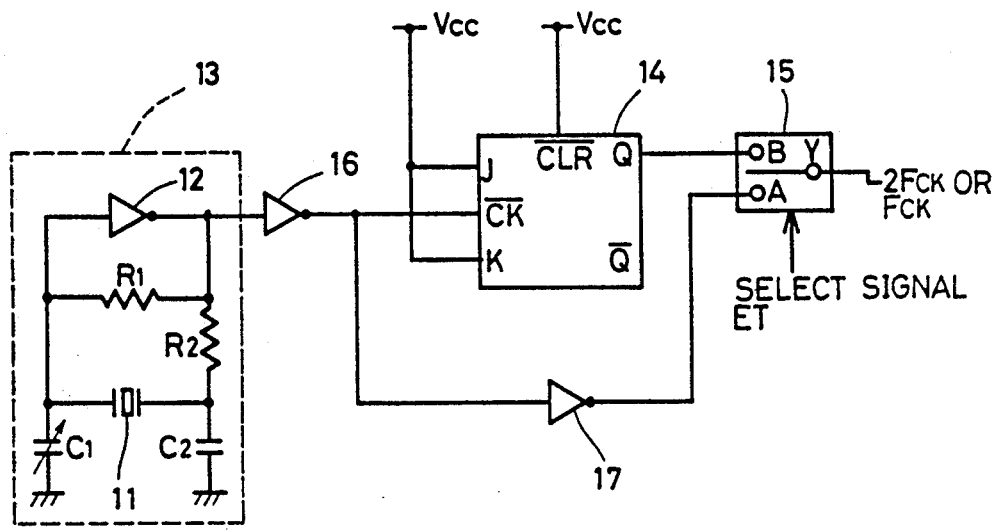
FIG. 17 is a specific block diagram of an oscillating circuit shown in FIG. 16.
Figure 18A:
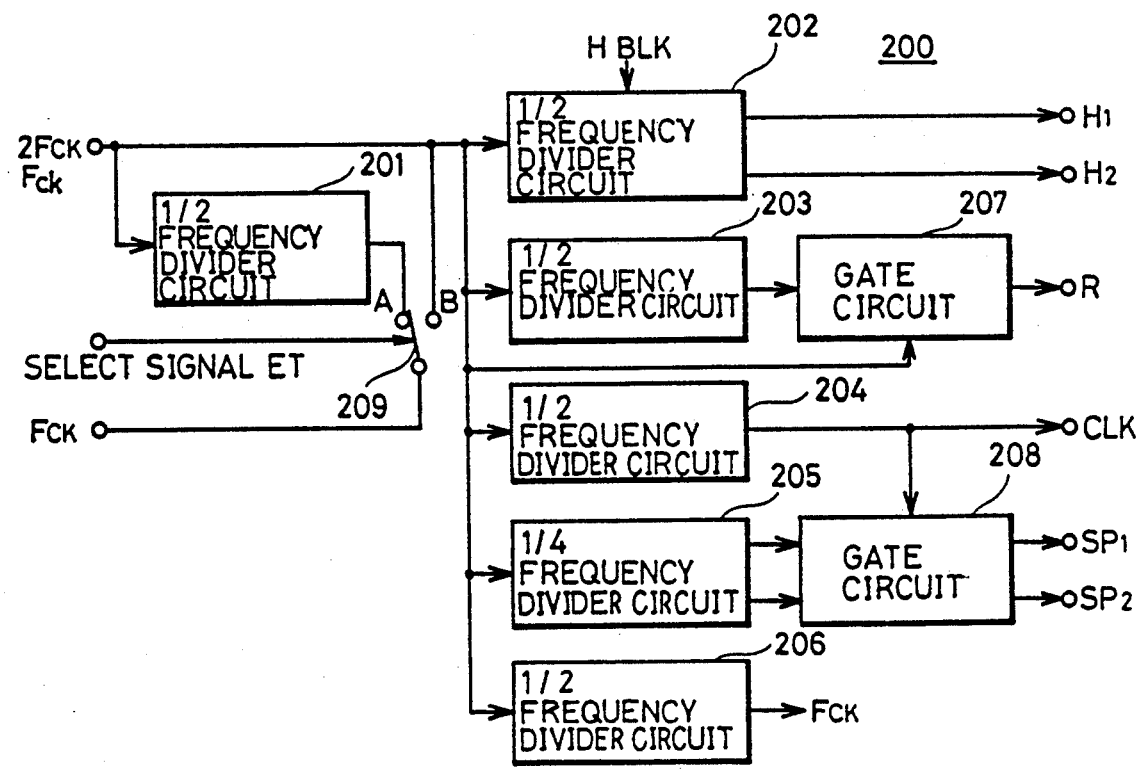
FIGS. 18A and 18B are specific block diagrams of a timing pulse generating circuit.
Figure 18B:
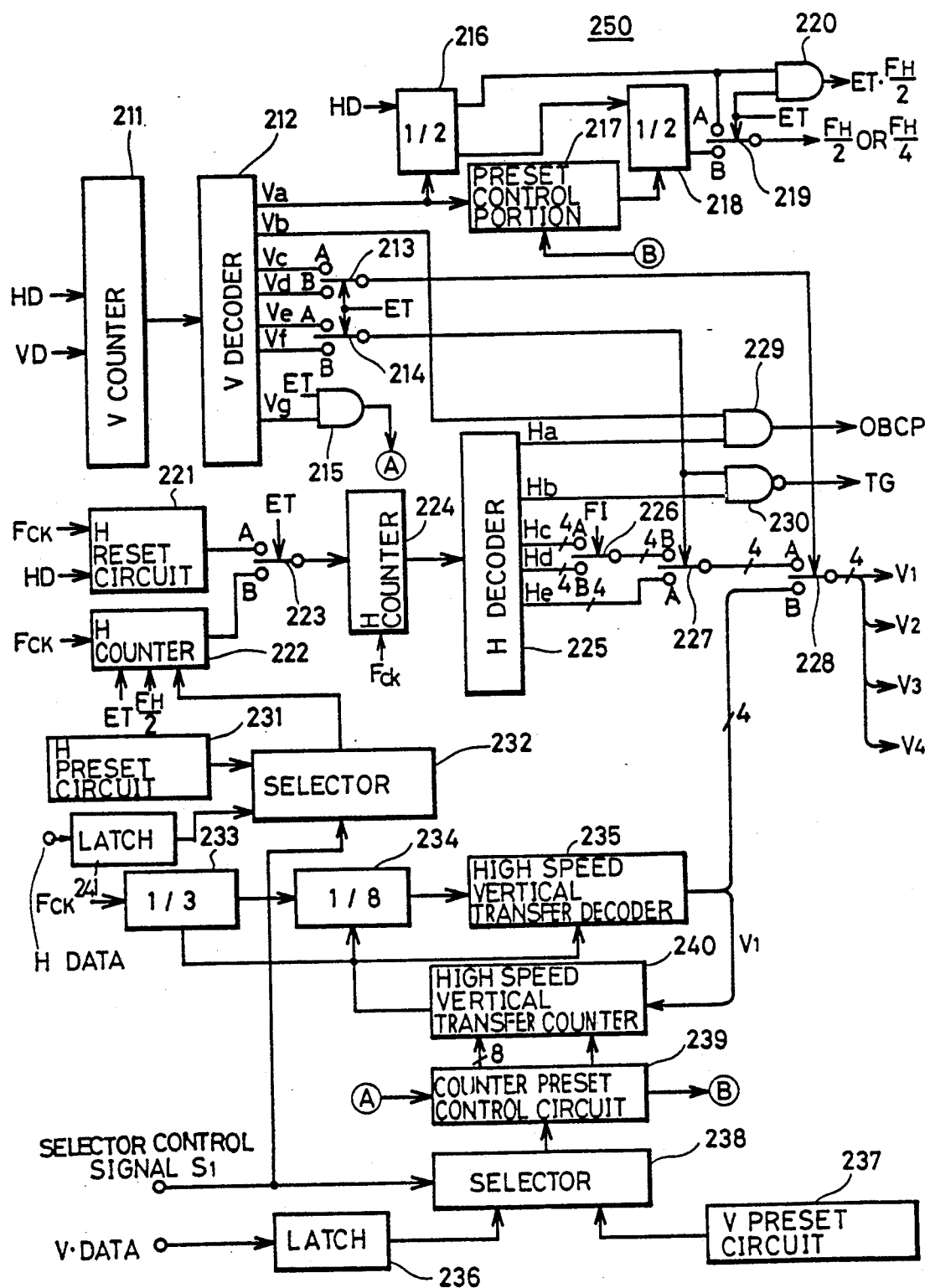

FIG. 16 is a schematic block diagram showing the timing pulse generating circuit 2 and the peripheral portions thereof shown in FIG. 15, FIG. 17 is a specific block diagram of the oscillating circuit shown in FIG. 16, and FIGS. 18A and 18B are specific block diagrams of the timing pulse generating circuit 2.

Specific structure of the oscillating circuit 10 and the timing pulse generating circuit 2 will be described in the following with reference to FIGS. 16 to 18B. First, referring to FIG. 17, the oscillating circuit 10 includes a crystal oscillating circuit 13, a JK flip flop 14, a selector 15 and inverters 16 and 17. The crystal oscillating circuit 13 includes a crystal oscillator 18, an inverter 12, resistances $R_1$ and $R_2$ and capacitors $C_1$ and $C_2$. The crystal oscillating circuit 13 generates a reference clock signal $2F_{CK}$ to apply the same to the JK flip flop 14 through the inverter 16 and to an A input of the selector 15 through the inverter 17. The JK flip flop 14 applies a clock signal $F_{CK}$ provided by dividing the reference clock signal $2F_{CK}$ by 2 to a B input of the selector 15.

The selector 15 is switched in response to a select signal ET which becomes a low "L" level in normal image pickup and a high "H" level in enlarging image pickup, applied from a switching switch 1 shown in FIG. 16. More specifically, when the select signal ET is at the "L" level, the selector 15 outputs the reference clock signal 2F K inputted to the A input from the Y output terminal. Further when the select signal becomes "H" level, the selector outputs from the Y output and the clock signal $F_{CK}$ applied from the JK flip flop 14. The reference clock signal $2F_{CK}$ or $F_{CK}$ generated from the oscillating circuit 10 is applied to the timing pulse generating circuit 2 shown in FIGS. 18A and 18B.

More specific structure of the timing pulse generating circuit 2 will be described with reference to FIGS. 18A and 18B. The reference clock signal $2F_{CK}$ or the clock signal $F_{CK}$ generated from the oscillating circuit 10 shown in FIG. 17 is applied to ½ frequency dividing circuits 201 to 204 and 206 and a ¼ frequency dividing circuit 205 included in a horizontal transferring circuit 200. The ½ frequency dividing circuit 201 divides the reference clock signal $2F_{CK}$ or the clock signal $F_{CK}$ by 2 to apply the clock signal $F_{CK}$ or tee reference clock signal $F_{CK}/2$ to the A input of the selector 209. The reference clock signal $2F_{CK}$ or the clock signal $F_{CK}$ is applied to the B input. The selector 209 is switched to the side of the B input when the select signal ET becomes "H" level in enlarging image pickup. Further, it is switched to the side of the A input when the select signal ET becomes "L" level in normal image pickup. Therefore, the clock signal $F_{CK}$ is always outputted from the Y output end of the selector 209 to be applied to the synchronizing signal generating circuit 71 shown in FIG. 15.

Figure 6:
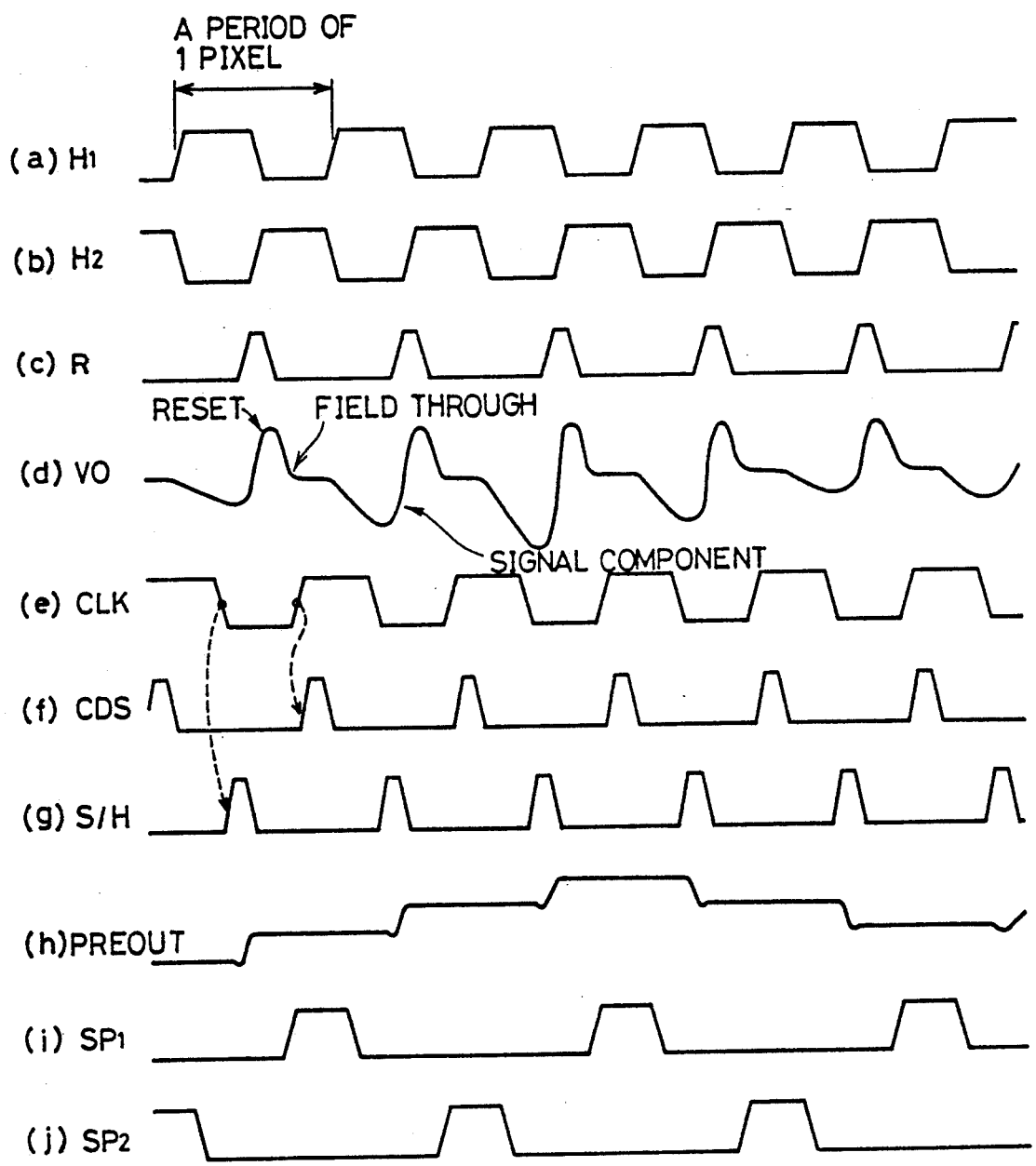
FIG. 6 is a diagram of waveforms showing timings of pulses in association with horizontal transfer.
Figure 7:
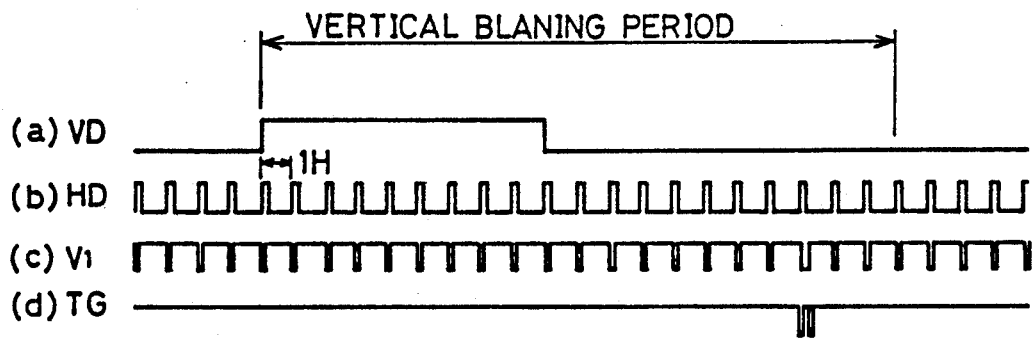
FIG. 7 is a diagram of waveforms showing timings near the vertical blanking period of the pulses in association with the vertical transfer in normal image pickup.
Figure 8:
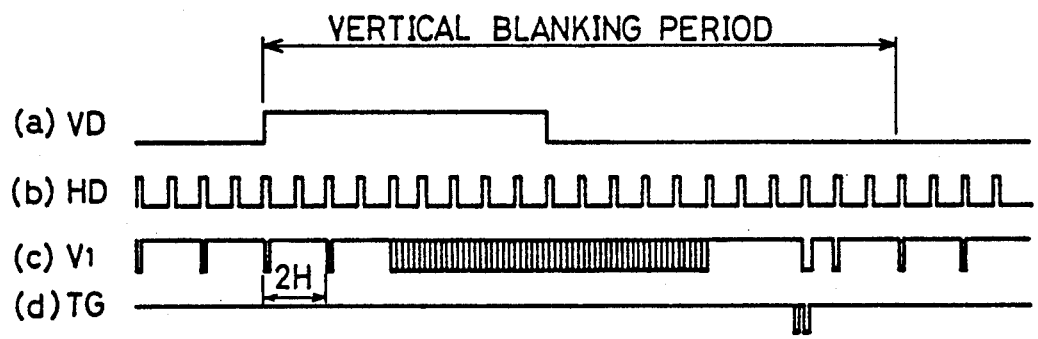
FIG. 8 is a diagram of waveforms showing timings of the pulses in association with the vertical transfer near the vertical blanking period in the enlarging image pickup.
Figure 9:
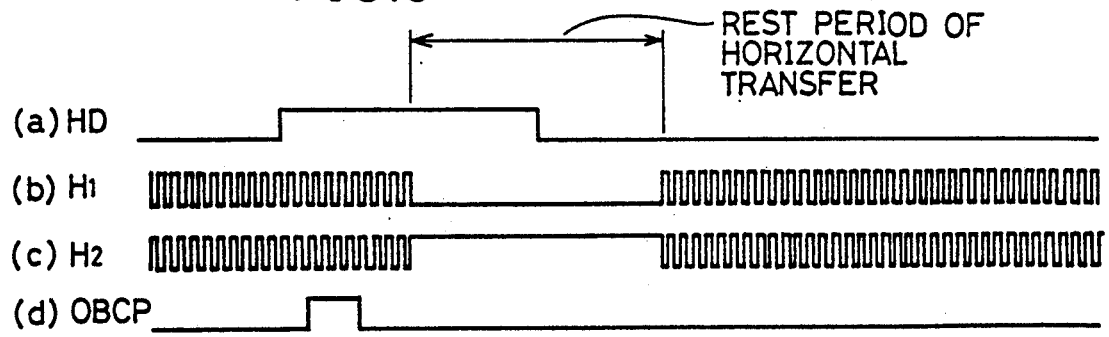
FIG. 9 is a diagram of waveforms showing timings near HD in normal image pickup.
Figure 10:
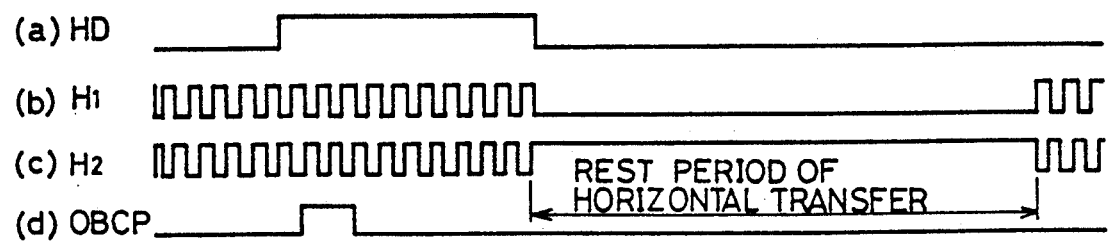
FIG. 10 is a diagram of waveforms showing timings near HD in enlarging image pickup.

The ½ frequency dividing circuit 202 divides the reference clock signal $2F_{CK}$ or the clock signal $F_{CK}$ by 2 to output horizontal transfer pulses $H_1$ and $H_2$ having different phases, as shown in FIGS. 6(a) and (b). The ½ frequency dividing circuit 203 divides the reference clock signal $2F_{CK}$ or the clock signal $F_{CK}$ by 2 and applies the divided output to a gate circuit 207. The gate circuit 207 outputs the reset pulse R such as shown in FIG. 6(c) in response to the divided output and to the reference clock signal $2F_{CK}$ or the clock signal $F_{CK}$. The ½ frequency dividing circuit 204 divides the reference clock signal $2F_{CK}$ or the clock signal $F_{CK}$ by 2 to output the clock pulse CLK such as shown in FIG. 6(e). The ¼ frequency dividing circuit 204 divides the reference clock signal $2F_{CK}$ or the clock signal $F_{CK}$ by 4 to apply the divided output to a gate circuit 208. The gate circuit 208 gates the clock signal CLK and the divided output to provide the sampling pulses $SP_1$ and $SP_2$ such as shown in FIGS. 6(i) and (j). The ½ frequency dividing circuit 206 divides the reference clock signal $2F_{CK}$ or the clock signal $F_{CK}$ by 2 to output the clock signal $F_{CK}$ or the reference clock signal $F_{CK}/2$.

The structure of the vertical transferring circuit 250 will be described with reference to FIG. 18B. A V counter 211 is reset by the vertical driving pulse VD to count the horizontal driving pulses HD. The counted output from the V counter 211 is applied to a V decoder 212. The V decoder 212 decodes the counted output of the V counter 211 and generates timing signals Va to Vg in the vertical direction. The timing signal Va is applied as a reset signal to the ½ frequency dividing circuit 211 and to a preset control portion 217. The ½ frequency dividing circuit 216 divides the horizontal driving pulses HD by 2 to generate a $F_H/2$ signal. The preset control portion 217 is provided for resetting or presetting the ½ frequency dividing circuit 218 in synchronization with the timing signal Va.

The ½ frequency dividing circuit 218 divides an output from the ½ frequency dividing circuit 216 by 2 to output a $F_H/4$ signal. The output signals from the ½ frequency dividing circuits 216 and 218 are applied to a selector 219. The selector 219 selects the $F_H/4$ signal which is the output from the ½ frequency dividing circuit 218 when the select signal ET becomes a high "H" level in enlarging, and it selects the $F_H/2$ signal which is the output from the ½ frequency dividing circuit 216 when the select signal ET becomes a low "L" level in normal image pickup. An AND gate 220 outputs an $ET \cdot F_H/2$ signal in response to the select signal ET and the output from the ½ frequency dividing circuit 216.

Timing signals Vc and Vd are applied from the V decoder 212 to the selector 213. The selector 213 selects the timing signal Vd when the select signal ET is at the "H" level and selects the timing signal Vc when the select signal ET is at the "L" level to apply the selected signal to a selector 228 as a select signal. The timing signals Ve and Vf are applied to the selector 214 from the V decoder 212. The selector 214 selects the timing signal Vf when the select signal ET is at the "H" level, and it selects the timing signal Ve when the select signal ET is at the "L" level to apply the selected signal to the selector 227 as a select signal. An AND gate 215 receives the timing signal Vg from the V decoder 212 as well as the select signal ET and it applies a trigger signal to a counter preset control circuit 239, which will be described later.

An H reset circuit 221 generates a reset pulse signal once in every 1H in normal image pickup in response to the horizontal driving pulse HD and the clock signal $F_{CK}$ to apply the same to the selector 223. An H preset circuit 31 is provided for setting a portion which is to be enlarged in the H direction in enlarging image pickup at a center of the screen of the normal image pickup. When the number of the clock signals $F_{CK}$ counted by the H counter 222 reaches the preset value, the H counter 222 applies a reset pulse in enlarging image pickup to the selector 223. The H counter 222 is capable of counting the clock signals FCK only when the select signal ET is at the "H" level. Further the counter presetting operation is carried out at the rising edge of the $F_H/2$ signal. The selector 223 applies the output from the H counter 222 to an H counter 224 when the select signal ET is at the "H" level. It then selects the output from the H reset circuit 221 to apply the same as a reset signal to the H counter 224 when the select signal ET is at the "L" level.

The H counter 224 is reset by the reset pulse selected by the selector 223, counts the clock signals $F_{CK}$ and applies the counted output to a H decoder 225. The H decoder 225 decodes the counted output from the H counter 224 and outputs timing signals Ha to He in the horizontal direction. The timing signal Ha is a signal for generating the optical black clamp pulse OBCP, which is applied to one input end of an AND gate 229. The other input end of the AND gate 229 is provided with the timing signal Vb from the V decoder 212, which was previously described. The timing signal Vb is at the "L" level during the vertical blanking period and it is at the "H" level during other periods. In response to these inputs, the AND gate 229 outputs the optical black clamp pulse OBCP. The timing signal Hb is a timing signal for generating the reading pulse TG, which is applied to one input end of an NAND gate 230. The timing signal Ve or Vf selected by the selector 214 is applied to the other input end of the NAND gate 230. The NAND gate 230 outputs the reading pulse TG from an output end thereof.

A ⅓ frequency dividing circuit 233 divides the clock signal $F_{CK}$ by 3 to apply the divided output to a ⅛ frequency dividing circuit 234. The ⅛ frequency dividing circuit 234 divides the clock signal $F_{CK}$ divided by 3, further by 8 to apply the output to a high speed vertical transfer decoder 235. The high speed vertical transfer decoder 235 decodes the divided output from the ⅛ frequency dividing circuit 234 and outputs high speed vertical transfer pulses which are respectively interposed to the vertical transferring pulses $V_1$ to $V_4$. These high speed vertical transfer pulses are applied to the selector 228. A high speed vertical transfer pulse corresponding to the vertical transfer pulse $V_1$ is applied to a high speed vertical transfer counter 240. The high speed vertical transfer counter 240 counts the rising edge of the pulse. Preset data are set by a counter preset control circuit 239 in the high speed vertical transfer counter 240. Further, when the number of pulse counted by the high speed vertical transfer counter 240 reaches the preset value, then a clear signal is applied to the ⅓ frequency dividing circuit 233, the ⅛ frequency dividing circuit 234 and to the high speed vertical transfer decoder 235.

A V preset circuit 237 is provided for setting a portion to be enlarged in the vertical direction in the enlarging image pickup at a center of the screen of the normal image pickup. A selector 238 selects outputs from the V preset circuit 237 to apply the same to the counter preset control circuit 239. The counter preset control circuit 239 is provided for setting the number of stages for transferring the charges of the CCD image sensor 6 by the high speed vertical transfer pulses. The control circuit 239 outputs a preset value to the high speed vertical transfer counter 240 in synchronization with the trigger signal which is the output from the AND gate 215 described above.

Figure 19:
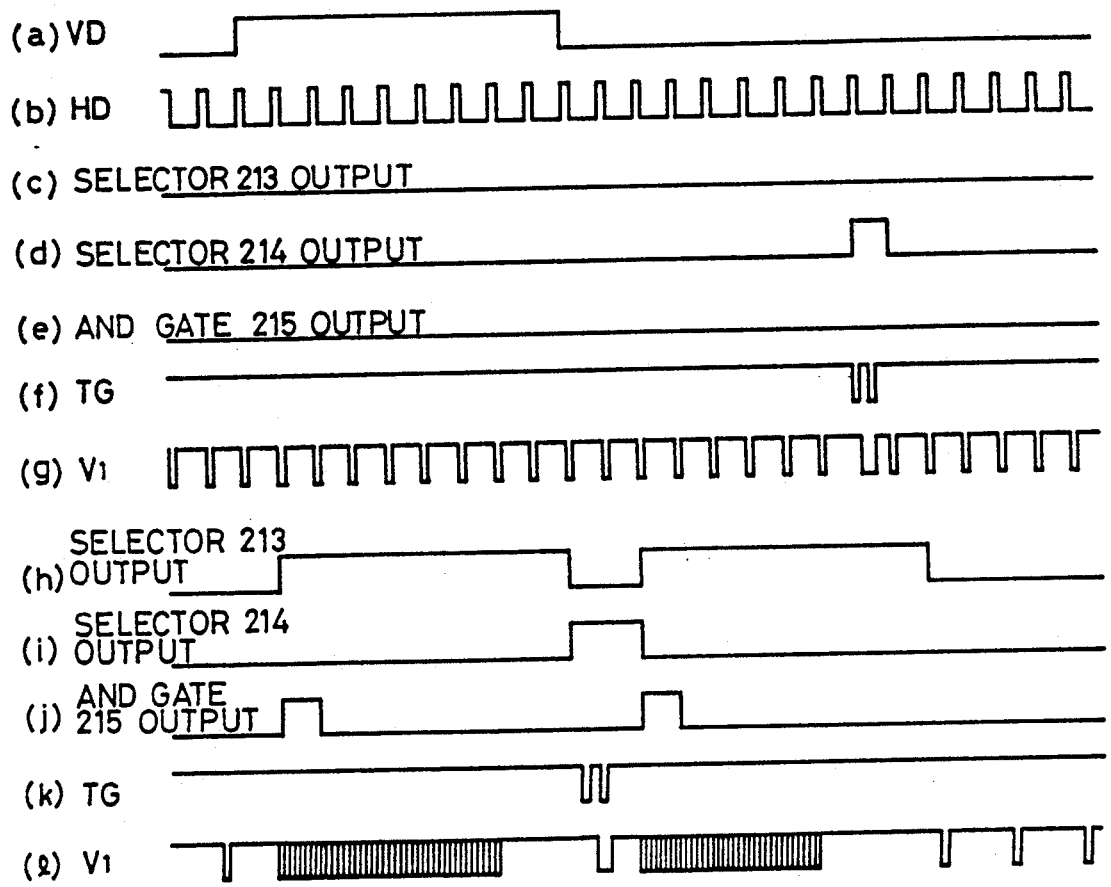
FIGS. 19, 20 and 21 are diagrams of waveforms showing timings of pulses in association with the vertical transfer generated from a timing pulse generating circuit.
Figure 20:
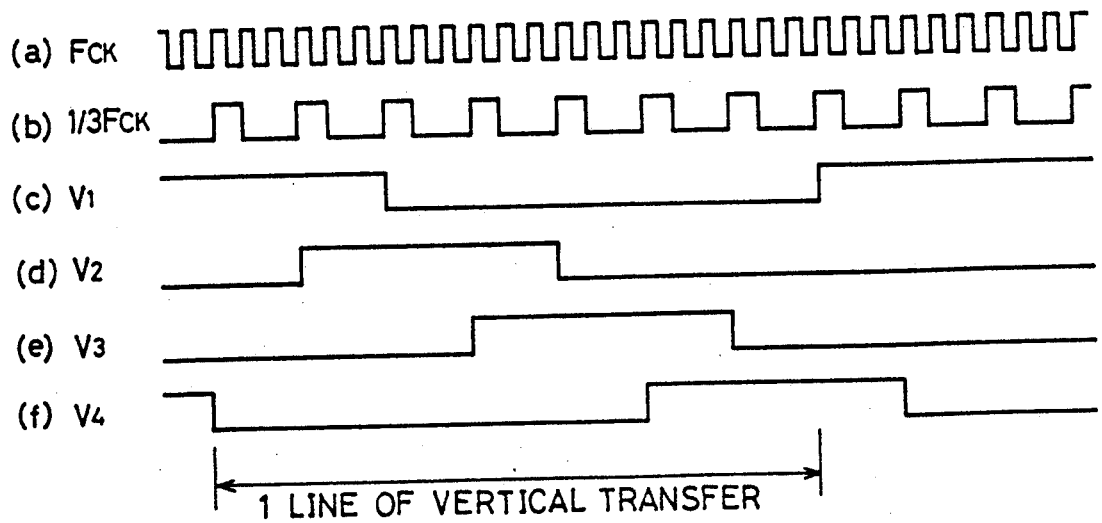
Figure 21:
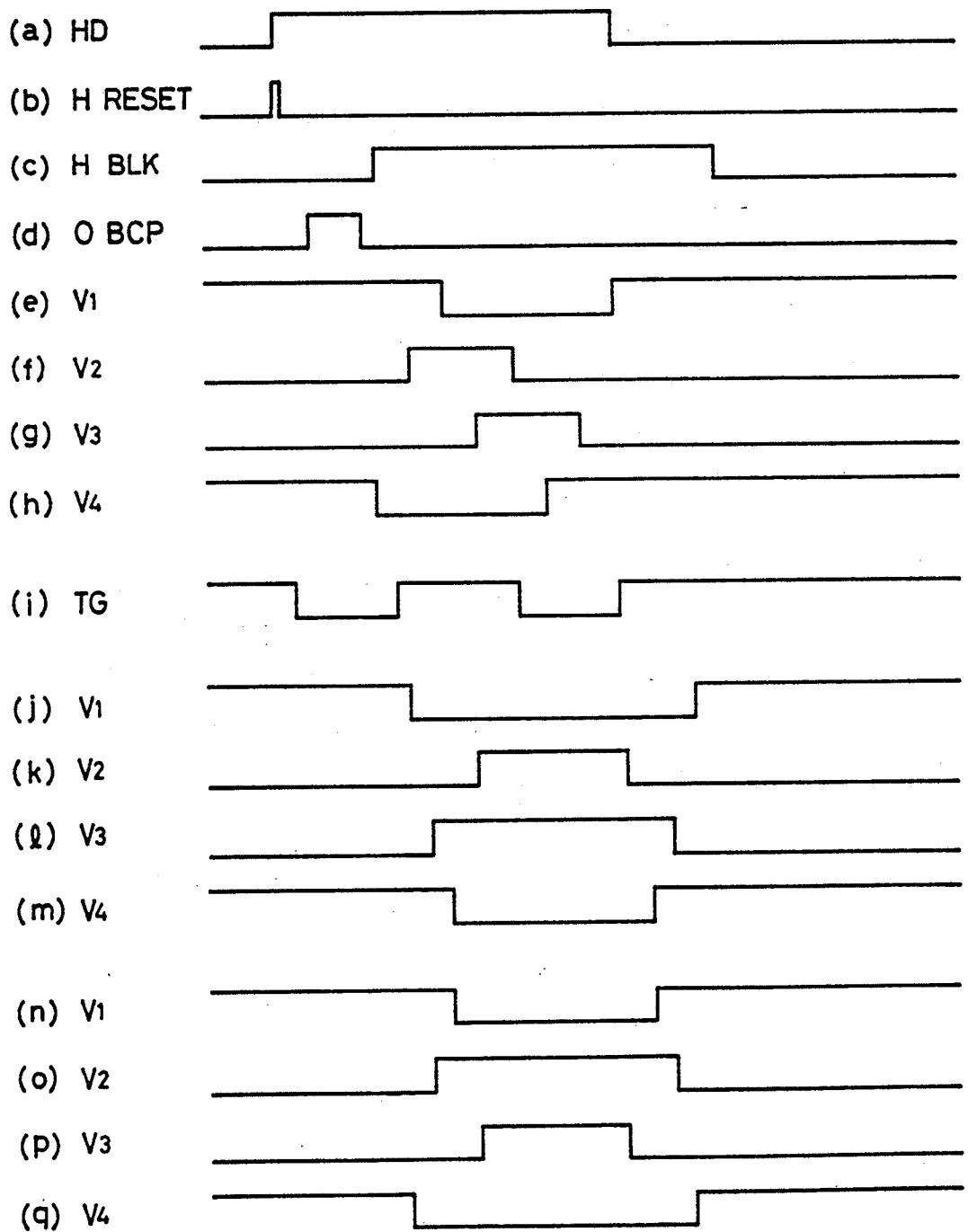

FIGS. 19, 20 and 21 are diagrams of waveforms showing timings of pulses in association with the vertical transfer in the timing pulse generating circuit.

The operation of one embodiment of the present invention will be described in the following with reference to the diagram of waveforms of the pulses in association with the horizontal transfer shown in FIG. 6 and FIGS. 15 to 21. In the normal image pickup, the select signal ET becomes "L" level, and the selector 15 shown in FIG. 17 is switched to the side of the A input. It then selects the reference clock signal $2F_{CK}$ generated by the crystal oscillating circuit 13 to apply the same to the timing pulse generating circuit 2. The ½ dividing circuit 201 shown in FIG. 18A divides the reference clock signal $2F_{CK}$ by 2 to output the $F_{CK}$ signal. Since the selector 209 is switched to the side of the A input in response to the select signal ET at the "L" level, the $F_{CK}$ signal is applied to the synchronizing signal generating circuit 71. The synchronizing signal generating circuit 71 applies the horizontal driving pulse HD and the vertical driving pulse VD to the timing signal generating circuit 2 in synchronization with the $F_{CK}$ signal.

Meanwhile, the ½ frequency dividing circuits 202, 203, 204 and 206 shown in FIGS. 18A respectively divide the reference clock signal $2F_{CK}$ by 2. Consequently, the ½ frequency dividing circuit 202 generates the horizontal transferring pulses $H_1$ and $H_2$ shown in FIGS. 6(a) and (b). The ½ frequency dividing circuit 203 applies the divided output to the gate circuit 207. The gate circuit 207 gates the reference clock signal $2F_{CK}$ and the ½ divided output to provide the reset signal R shown in FIG. 6(c). The ½ frequency dividing circuit 204 outputs the divided output as the clock signal CLK shown in FIG. 6(e). The ¼ frequency dividing circuit 205 divides the reference clock signal $2F_{CK}$ by 4 to apply the same to the gate circuit 208. The gate circuit 208 gates the ¼ divided output by the clock signal CLK to output the sampling pulses $SP_1$ and $SP_2$ such as shown in FIGS. 6(i) and (j). The ½ frequency dividing circuit 206 outputs the $F_{CK}$ signal which is the ½ divided output to the vertical transferring circuit 250 shown in FIG. 18(b).

In the enlarging image pickup, the select signal ET becomes "H" level, so that the selector 15 shown in FIG. 17 is switched to the side of the B input. The JK flip flop 14 outputs the FCK signal by dividing the reference clock signal 2FCK by 2, with the FCK applied to the timing pulse generating circuit 2 through the selector 15. The selector 209 shown in FIG. 18A is switched to the side of the B input in response to the select signal ET at the "H" level, and the $F_{CK}$ signal is applied to the synchronizing signal generating circuit 71 through the selector 209. The synchronizing signal generating circuit 71 outputs the horizontal driving pulse HD and the vertical driving pulse VD in synchronization with the $F_{CK}$ signal.

The ½ frequency dividing circuits 202, 203, 204 and 206 divide the $F_{CK}$ signal by 2 and the ¼ frequency dividing circuit 205 divides the $F_{CK}$ signal by 4. Consequently, the periods of the horizontal transfer pulses $H_1$, $H_2$, the reset signal R, the clock signal CLK and of the sampling pulses $SP_1$ and $SP_2$ are doubled in the enlarging image pickup as compared with the normal image pickup.

The operation of the vertical transferring circuit 250 will be described with reference to FIG. 18B. In the normal image pickup, the V counter 211 is reset by the vertical driving pulse VD shown in FIG. 19(a) and counts the horizontal driving pulse HD shown in FIG. 19(b). The V decoder 212 decodes the counted output of the V counter 211 to output vertical timing signals Va to Vg. The selectors 213 and 214 are switched to the side of the A input in response to the select signal ET at the "L" level. The selector 213 outputs the vertical timing signal Vc shown in FIG. 19(c) and the selector 214 outputs the vertical timing signal Ve shown in FIG. 19(d).

Meanwhile, the H reset circuit 221 gates the horizontal driving pulse HD and the $F_{CK}$ signal and outputs the H reset pulse at the timing of the rising edge of the horizontal driving pulse HD shown in FIG. 21(a), as shown in FIG. 21(b). The selector 223 is switched to the side of the A input by the select signal ET at the "L" level. Consequently, the H reset pulse is applied to the H counter 224 to reset the same through the selector 223. The H counter 224 counts the $F_{CK}$ signals. The H decoder 225 decodes the counted output from the H counter 224 and outputs the horizontal timing signals Ha to He.

The horizontal timing signal Ha is applied to one input end of the AND gate 229. A vertical timing signal Vb is applied to the other input end of the AND gate 229. The AND gate 229 gates these signals and outputs the optical black clamp pulse OBCP shown in FIG. 21(d). The horizontal timing signal Hb is applied to one input end of an NAND gate 230 and the vertical timing signal Ve selected by the selector 214 is applied to the other input end of the NAND gate 230. The NAND gate 230 gates these signals to output the reading pulse TG shown in FIGS. 19(f) and 21(i).

The horizontal timing signals Hc, Hd and He outputted from the H decoder 250 are 4 bit signals having different timings, and these horizontal timing signals Hc, Hd and He are outputted as the vertical transfer pulses $V_1$ to $V_4$ shown in FIGS. 21 (j) to (m), (n) to (q) and (e) to (h). The signals Hc and Hd are outputted through the selectors 226, 227 and 228 while the signal He is outputted through the selectors 227 and 228. Namely, the signal Hc is used as the reading vertical transfer pulse of the odd fields, the signal Hd is used as the reading vertical transfer pulse of the even fields and the signal He is used as the normal vertical transfer pulse. The selector 226 is selected by a field index signal FI. The signal Hc is outputted in the odd field (FI ="L") and Hd is outputted in the even field (FI ="H").

The pulses in association with the vertical transfer in the enlarging image pickup will be subsequently described. As shown in FIG. 19(h), the selector 213 selects the V timing signal Vd to apply the same as a select signal to the selector 228. The selector 228 is switched to the side of the selector 227 while the select signal is at the "L" level. The selector 228 is switched to the side of the output of the high speed vertical transfer decoder 235 while the select signal is at the "H" level. As shown in FIG. 19(i), the selector 214 selects the vertical timing signal Vf to apply the same to the NAND gate 230 as well as to the selector 227 as a select signal.

The selector 227 selects the side of the selector 226 while the select signal from the selector 214 is at the "H" level, and it selects the H timing signal He to apply the same to the selector 228 while the select signal is at the "L" level. The selector 228 selects the output of the high speed vertical transfer decoder 235 while the output of the selector 213 is at the "H" level and outputs the high speed vertical transfer pulses generated in two time periods in the vertical blanking period, as shown in FIG. 19(*l*).

The high speed vertical transfer pulse is generated in the following manner. Namely, the ⅓ frequency dividing circuit 233 divides the $F_{CK}$ signal shown in FIG. 20(*a*) by 3 and provides the ⅓ divided output shown in FIG. 20(*b*) to the ⅛ frequency dividing circuit 234. The ⅛ frequency dividing circuit 234 divides the $F_{CK}$ signal divided by 3 further by 8 and applies the resulting output to the high speed vertical transferring decoder 235. The high speed vertical transfer decoder 235 decodes the divided output from the ⅛ frequency dividing circuit 234 and outputs the high speed vertical transfer pulse to apply the same to the selector 228 as shown in FIGS. 20(*c*) to (*f*). The high speed vertical transfer pulse $V_1$ is also applied to the high speed vertical transfer counter 240 which counts the signal. A value for setting the portion to be enlarged at the center of the screen in the normal image pickup is preset in the V preset circuit 237. The selector 238 selects the preset value in the V preset circuit 237 to apply the same to the counter preset control circuit 239. The counter preset control circuit 239 sets the preset value selected by the selector 238 in the high speed vertical transfer counter 240 using the output from the AND gate 215 as a trigger. When the number of signals counted by the high speed vertical transfer counter 240 reaches the preset value, the counter 240 clears the ⅓ frequency dividing circuit 233 and the ⅛ frequency dividing circuit 234 and the high frequency vertical transfer decoder 235.

Figure 11:
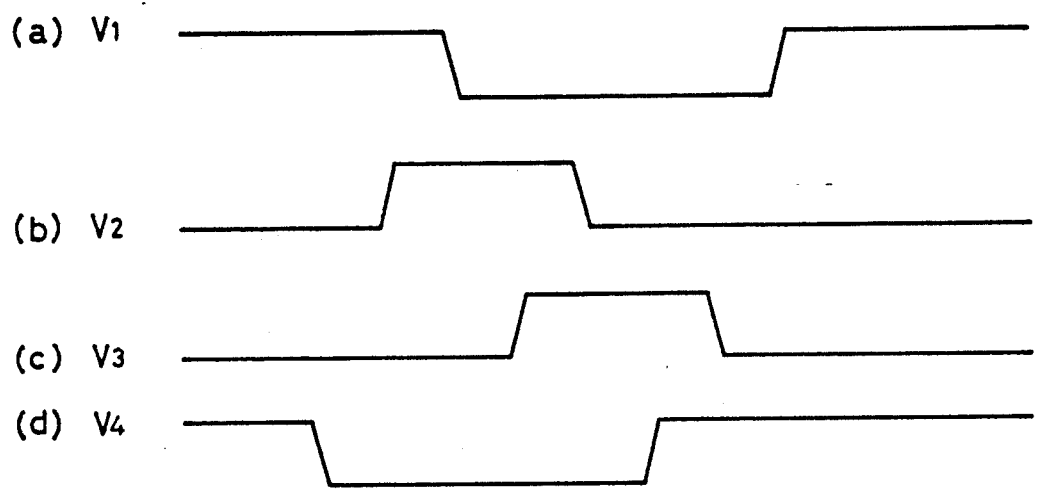
FIG. 11 is a diagram of waveforms showing timings of the vertical transfer pulse for transferring charges of the CCD in the forward direction.
Figure 12:
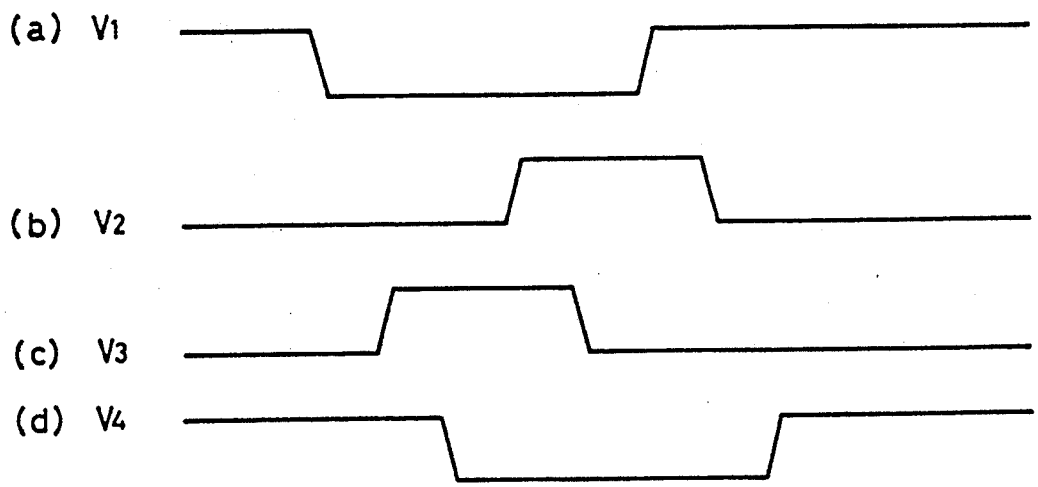
FIG. 12 is a diagram of waveforms showing timings of the vertical transfer pulse in reversal transfer.

The above described operation is carried out before and after the output of the reading pulse TG in the vertical blanking period. Meanwhile, the vertical transfer pulses $V_1$ to $V_4$ shown in FIGS. 21(*e*) to (*h*) have the normal vertical transfer timings, corresponding to FIG. 11.

Figure 13:
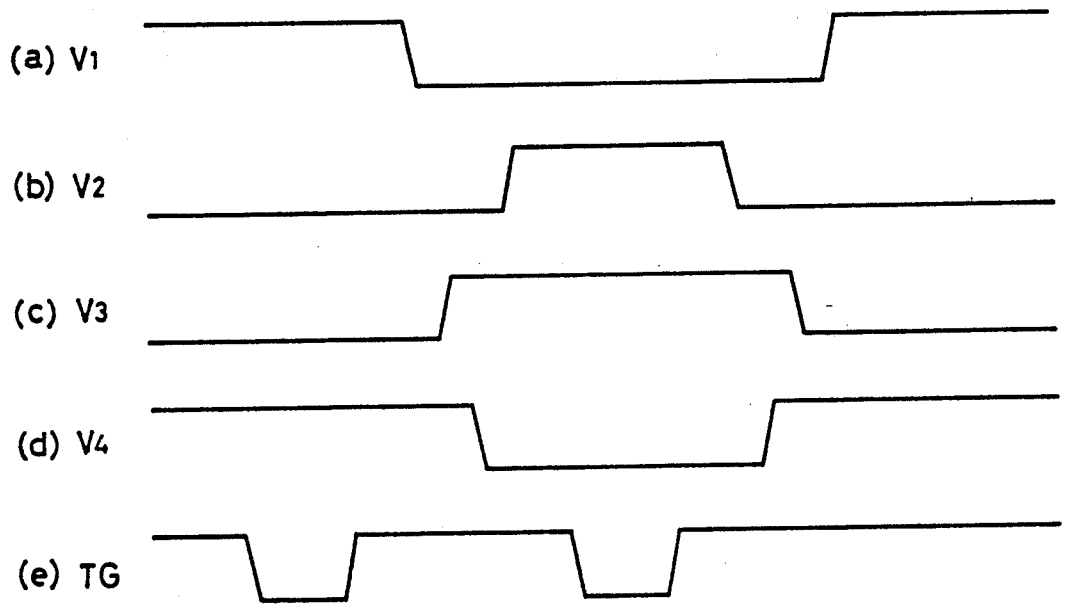
FIG. 13 is a diagram of waveforms showing reading timings of odd fields.
Figure 14:
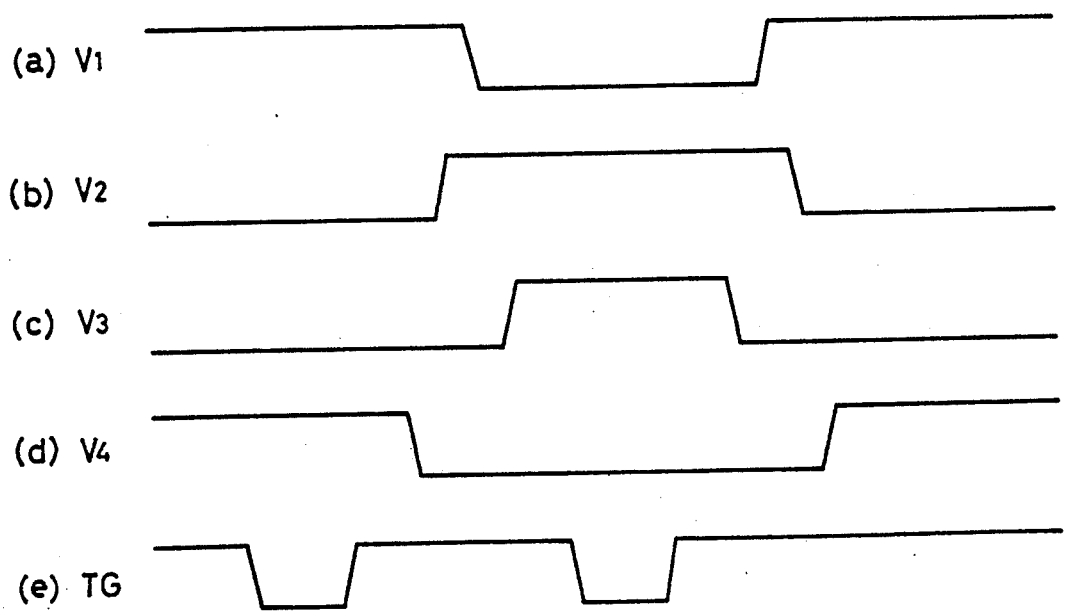
FIG. 14 is a diagram of waveforms showing reading timings of even fields.

The vertical transfer pulses $V_1$ to $V_4$ shown in FIGS. 21(*j*) to (*m*) show the reading timings of the odd fields, corresponding to FIG. 13. The vertical transfer pulses $V_1$ to $V_4$ shown in FIGS. 21(*n*) to (*q*) show the reading timing in the even fields, corresponding to FIG. 14.

Figure 22A:
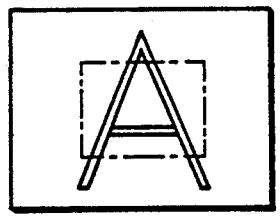
FIG. 22A shows images in normal image pickup.
Figure 22B:
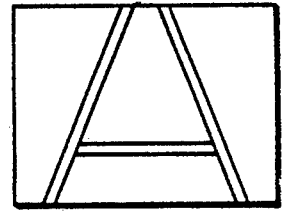
FIG. 22B shows images when a central portion of the image shown in FIG. 22A is enlarged.

FIG. 22A shows an image in the normal image pickup while FIG. 22B shows an image in the enlarging image pickup.

As is apparent from the foregoing, the vertical transfer pulses $V_1$ to $V_4$ are outputted once in every 2H as shown in FIG. 19(l) ($V_2$ to $V_4$ are not shown), and the timing of output can be set at an arbitrary point of the signal of 1H by means of the H preset circuit 231. Consequently, an area at the center of the screen in the normal image pickup such as shown in FIG. 22A can be enlarged as a portion to be enlarged, that is, the necessary signal portion, to provide an image as shown in FIG. 22B.

Vertical transfer and reading will be described in the following. Charges stored in all photodiodes 50*a* of the CCD image sensor 6 are read to the corresponding vertical registers 51*a* by the reading pulse TG. Thereafter, when a central area of the screen is to be enlarged, high speed vertical transfer in the forward direction is carried out for a number of times, which number corresponds to the number of stages of the vertical registers, in order to sweep the charges stored in the vertical registers 51*a* corresponding to the upper ¼ portion of the screen which is unnecessary.

On this occasion, since the horizontal transfer is carried out the same manner as in the normal image pickup, the amount of charges may possibly exceed the capacity of the horizontal register 53. In that case, there is a possibility of the overflown charges entering a video period over the vertical blanking period, so that a vertical timing is set such that reading and high speed vertical transfer period are terminated earlier. Namely, the reading and high speed vertical transfer periods are set with the timings such as shown in FIGS. 19(*k*) and (*l*). Thereafter, vertical transfer is carried out once in every 2H during the video period by the vertical transfer pulses $V_1$ to $V_4$. Thus signals of the central area of the screen can be obtained.

Thereafter, high speed vertical transfer in the forward direction is carried out for a number of times, the number corresponds to at least the number of remaining stages in the next vertical blanking period, in order to sweep out charges corresponding to the lower 1/4 area of the screen which is unnecessary.

In one embodiment of the present invention, combination of the photodiodes 50*a* is the same for both the odd fields and the even fields in reading the CCD image sensor 6 in the enlarging image pickup. In that case, the select signal of the selector 226 may be set at "L" level or "H" level instead of the field index signal FI. By employing the method of reading which does not include interlacing, a clear image without jitters can be provided. However, the vertical resolution is degraded as there is no interlacing, so that switching by a switch or the like may preferably be provided.

Figure 23:
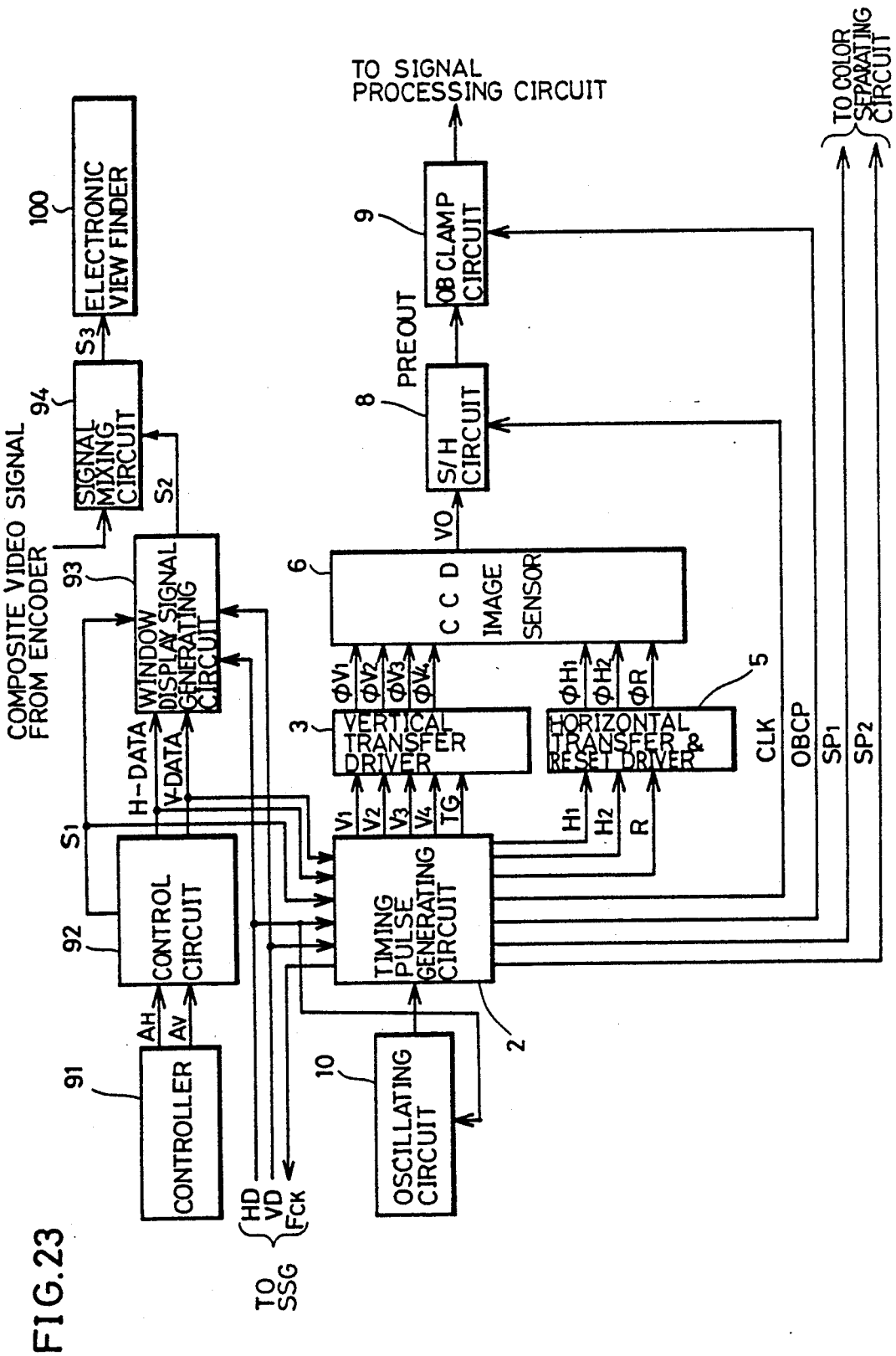
FIG. 23 is a schematic block diagram of another embodiment of the present invention.
Figure 24:
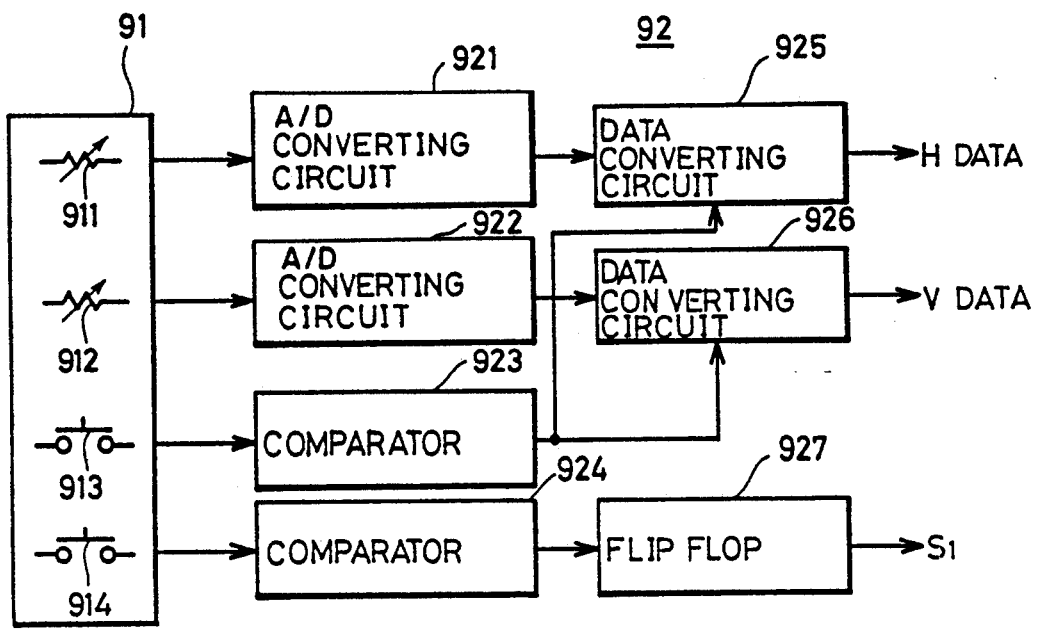
FIG. 24 is a block diagram of a controller and a controlling circuit shown in FIG. 23.
Figure 25:
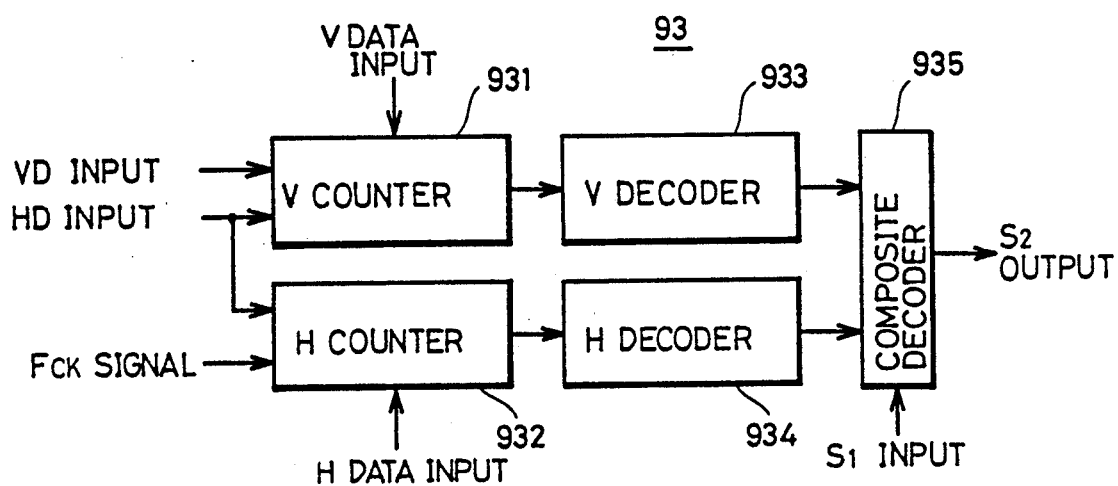
FIG. 25 is a block diagram showing a window display signal generating circuit shown in FIG. 23.

FIG. 23 is a schematic block diagram showing another embodiment of the present invention, FIG. 24 is a block diagram showing a controller and a control circuit shown in FIG. 24 and FIG. 25 is a block diagram showing a window display signal generating circuit shown in FIG. 23.

In the embodiment shown in FIGS. 23 to 25, an area to be enlarged may be arbitrarily selected by means of a controller 91. For this purpose, a controller 91, a control circuit 92, a window display signal generating circuit 93 and a signal mixing circuit 94 are provided in addition to the structure shown in FIG. 16. A joy stick or the like is used as the controller 91, including variable resistances 911 and 912 and switches 913 and 914. The variable resistance 911 outputs a position signal $A_H$ in the horizontal direction when an operating lever, not shown, is moved in the horizontal direction. The variable resistance 912 outputs a position signal $A_V$ in the vertical direction when the lever is moved in the vertical direction. The switch 913 is provided to select whether the area to be enlarged should be set at the central portion or an arbitrary area for enlargement is to be selected. The switch 914 is provided for switching between the normal image pickup and the enlarging image pickup.

An output from the variable resistance 911 is applied to an A/D converting circuit 921 in which the position signal $A_H$ in the horizontal direction is converted into a digital signal to be applied to a data converting circuit 925. An output of the variable resistance 912 is applied to an A/D converting circuit 922 where the position signal $A_V$ in the vertical direction is converted into a digital signal to be applied to a data converting circuit 926. An output of the switch 913 is applied to a comparator 923 in which closing or opening of a contact of the switch 913 is determined. The comparator 923 is provided to determine whether the enlarging image pickup is of the central area or of an arbitrary area in response to the close/open determination of the switch 913. The determined output is applied to the data converting circuits 925 and 926.

When it is determined by the comparator 923 that an arbitrary area is to be enlarged, the data converting circuits 925 and 926 output H data and V data indicative of the arbitrary area to be enlarged. If it is determined that the central area is to be enlarged, they output H data and V data indicative of the central portion, to apply the same to a timing pulse generating circuit 2 and the window display signal generating circuit 93. A comparator 924 is provided for determining whether the operation is the normal image pickup or the enlarging image pickup in response to close/open determination of the switch 914, and the determined output from the comparator applied to a flip flop 927. The flip flop 927 generates a select signal $S_1$ which becomes "L" level in the normal image pickup and "H" level in the enlarging image pickup, for example, in response to the determined output from the comparator 924 to apply the same to the timing pulse generating circuit 2, the oscillating circuit 10 and the window display signal generating circuit 93.

The window display signal generating circuit 93 will be described in the following with reference to FIG. 25. The window display signal generating circuit 93 generates a window display signal for displaying the area to be enlarged set by the controller 91 on an electronic view finder 100. For this purpose, the window display signal generating circuit 93 comprises a V counter 931, an H counter 932, a V decoder 933, an H decoder 934 and a composite decoder 935. The horizontal driving pulses HD and the vertical driving pulses VD from the synchronizing signal generating circuit 71 and the V data generated in the control circuit 92 are applied to the V counter 931. The V counter 931 is reset by the vertical driving pulse VD and counts the horizontal driving pulses HD whose number corresponds to the V data. The counted output is applied to the V decoder 933 and a signal indicative of a position of the area to be enlarged in the vertical direction is applied to the composite decoder 935.

The horizontal driving pulses HD and $F_{CK}$ signals as well as the H data generated in the control circuit 92 are inputted to the H counter 932. The H counter 932 is reset by the horizontal driving pulse HD and counts the $F_{CK}$ signals whose number corresponds to the H data. The counted output is applied to the H decoder 934 and a signal indicative of a position of the area to be enlarged in the horizontal direction is applied to the composite decoder 935. In response to the input of the select signal $S_1$ indicative of the normal or the enlarging image pickup outputted from the control circuit 92, the composite decoder 935 outputs a signal $S_2$ indicative of the horizontal and vertical position of the area to be enlarged to apply the same to a signal mixing circuit 94.

The signal mixing circuit 94 mixes signal $S_2$ indicating the area to be enlarged with the composite video signals from the encoder to apply the mixed output to the electronic view finder 100.

Meanwhile, the H data generated from the control circuit 92 shown in FIG. 23 is latched by a latch circuit 241 in the timing signal generating circuit 2 and the latched output is applied to the selector 232. The V data is latched by a latch 236 with the latched output applied to the selector 238. The select signal $S_1$ outputted from the flip flop 927 shown in FIG. 24 is applied to the timing pulse generating circuit 2 as the select signal ET. The selectors 232 and 238 select the H data and V data respectively, presetting the H data at the H counter 222 and presetting the V data at the counter preset control circuit 239. The H counter 222 counts the number of $F_{CK}$ signals which number corresponding to the H data indicative of the position of the arbitrary area to be enlarged in the H direction, and resets the H counter 224 through the selector 223. Consequently, the H counter 224 starts counting of the clock signals $F_{CK}$ at a point indicating the position of the arbitrary area to be enlarged in the H direction, and the counted output is applied to the H decoder 225. The H decoder 225 outputs horizontal timing signals Ha to He of the arbitrary area to be enlarged in the H direction, in response to the counted output of the H counter 224.

Figure 22C:
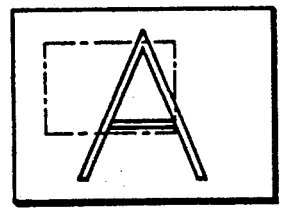
FIG. 22C shows images in normal image pickup and FIG. 22D shows images when a portion surrounded by a chain dotted line in FIG. 22C is enlarged.
Figure 22D:
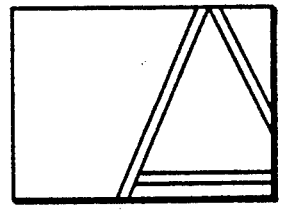

The counter preset control circuit 239 presets the number of stages of the arbitrary area to be enlarged in the vertical direction in the high speed vertical transfer counter 240 in response to the preset V data. When the number of the high speed vertical transfer pulses counted by the high speed vertical transfer counter 240 reaches the preset number, the counter 240 resets the ⅓ frequency dividing circuit 233, ⅓ frequency dividing circuit 234 and the high speed vertical transfer decoder 235. Consequently, when an arbitrary area to be enlarged surrounded by a chain dotted line shown in FIG. 22C is designated by the controller 91, images in that area are enlarged as shown in FIG. 22D.

Figure 26:
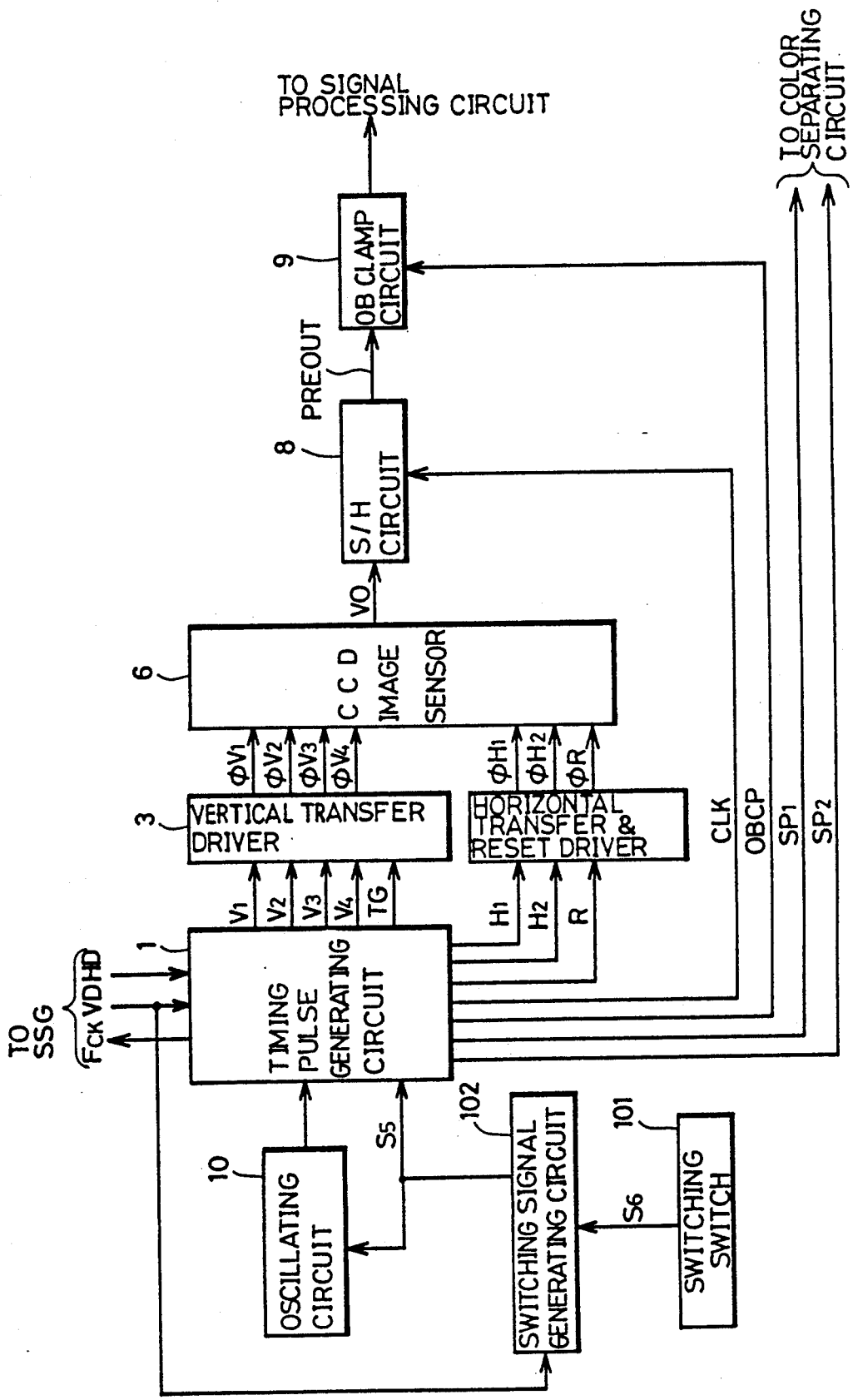
FIG. 26 is a block diagram showing a further embodiment of the present invention.
Figure 27:
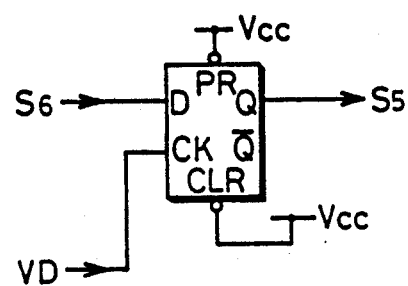
FIG. 27 is a diagram showing a switching signal generating circuit shown in FIG. 26.

FIG. 26 is a block diagram showing a further embodiment of the present invention and FIG. 27 shows a switching signal generating circuit shown in FIG. 26.

In the embodiment shown in FIGS. 26 and 27, the enlarging image pickup and the normal image pickup are switched in synchronization with the vertical driving pulse VD so as to prevent disturbance of the images on the screen at the time of switching. For this purpose, a switching switch 101 for switching between the normal image pickup and the enlarging image pickup is provided, and a switching signal $S_6$ from this switch 101 is applied to a switching signal generating circuit 102. As shown in FIG. 27, the switching signal generating circuit 102 is formed of a D type flip flop. The switching signal $S_6$ is applied from the switching switch 101 to a D input end of the D type flip flop and a vertical driving pulse VD is applied to a clock input end.

A switching signal $S_5$ which is in synchronization with the vertical driving pulse VD is outputted from a Q output of the D type flip flop to be applied to the timing signal generating circuit 2. The switching signal $S_5$ is used as the select signal ET of the timing signal generating circuit.

Figure 28:
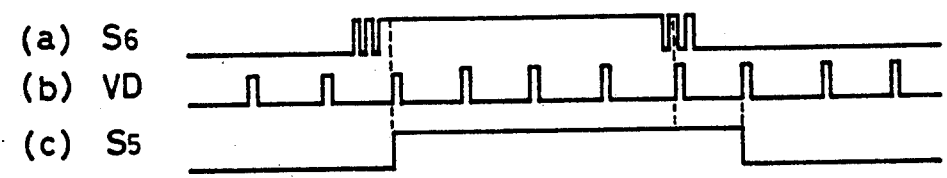
FIG. 28 is a diagram of waveforms showing operational timings of the switching signal generating circuit shown in FIG. 27.

FIG. 28 is a diagram of waveforms showing the operational timings of the switching signal generating circuit shown in FIG. 27. As shown in FIG. 28(a), the switching signal $S_6$ outputted from the switch 101 includes chattering at the rising and falling edges. However, since the D type flip flop is set at a timing of the rise of the vertical driving pulse VD shown in FIG. 28(b), the switching signal $S_5$, which is in synchronization with the vertical driving pulse VD without chattering, is outputted from the Q output of the D type flip flop, as shown in FIG. 28(c). Consequently, a very smooth switching operation is realized as the disturbance of the images caused by the chattering or the disturbance of the images caused by the switching at an intermediate point of the images can be eliminated.

As described above, according to the embodiments of the present invention, an arbitrary ¼ area of the screen of the normal image pickup can be enlarged twofold (fourfold in area) in the enlarging image pickup. If the area to be enlarged is set at a central portion of the screen, the same effect as the optical enlargement can be provided, which is very convenient for the use with the zoom lens. A trimming function of an arbitrary area can also be provided.

Since the same combination of photodiodes is used for reading both the odd fields and even fields, stable images without jitter between fields can be provided.

Since the area to be enlarged on the screen can be arbitrarily redesignated, the area to be enlarged can be directly checked visually by displaying that area on an electronic view finder or the like, enabling smooth enlarging of the images.

Since the switching between the normal image pickup and the enlarging image pickup is carried out by a signal is synchronization with the vertical driving pulse, disturbance of images generated at the switching of the screen can be prevented.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image pickup apparatus capable of picking up images of an object and electrically enlarging the picked up images by n times as compared to normal image pickup, when switched to an enlarging pickup mode from a normal pickup mode, wherein n is a positive integer, comprising:

means for imaging the object including a plurality of light receiving elements arranged in horizontal and vertical directions, receiving light from the object and outputting image signals, outputs of the light receiving elements arranged in the horizontal direction being transferred in the vertical direction during a horizontal blanking period and the outputs from the light receiving elements in the horizontal direction previously transferred in said vertical direction being transferred in the horizontal direction during a horizontal scanning period to thereby provide said image signals;

switching means for switching the image pickup apparatus to said enlarging pickup mode, and outputting an enlarging instructing signal for enlarging picked up images by n times;

reference pulse signal generating means, operatively connected to said switching means, for generating reference pulse signals in response to receiving said enlarging instructing signal;

synchronizing signal generating means for generating horizontal synchronization signals and vertical synchronization signals, both said horizontal and vertical synchronization signals being synchronized with the reference pulse signals generated from said reference pulse generating means;

horizontal transfer pulse generating means, operatively connecting said reference pulse signal generating means and said switching means to said solid state imagining means, and responsive to said enlarging instructing signal from said switching means, for outputting pulses to said solid state imaging means for transferring the outputs from said light receiving elements in the horizontal direction, said pulses having a signal period n times larger than the normal image pickup signal period, in synchronization with the reference pulse signals generated from said reference pulse signal generating means;

vertical transfer pulse generating means, operatively connecting said switching means, said synchronizing signal generating means, said horizontal transfer pulse generating means and said reference pulse signal generating means to said solid state imaging means, and responsive to said horizontal and vertical synchronizing signals and said enlarging instructing signal from said switching means, for outputting vertical transfer pulses to said solid state imaging means, once in each of a plurality of n horizontal scanning periods, for transferring the outputs from said light receiving elements in the vertical direction;

high speed vertical transfer pulse generating means, operatively connected to said vertical pulse transfer generating means, said reference pulse signal generating means and said solid state imaging means, for transferring unnecessary outputs, provided by the n time enlargement, out of said light receiving elements in the vertical direction, at high speed in the vertical direction, for a predetermined number of times during two predetermined signal periods of a vertical blanking period, for generating high speed vertical transfer pulses in response to said reference pulse signals, and for interposing the generated high speed vertical transfer pulses into said vertical transfer pulses for subsequent input to said solid state imaging means; and reading pulse generating means, operatively connected to said vertical transfer pulse generating means and said solid state imaging means, for generating reading pulses, subsequently output to said solid state imaging means, for reading image signals from said solid state image pickup means during said predetermined two periods in said vertical blanking period in synchronization with said horizontal synchronization signals and said vertical synchronization signals.

2. The image pickup apparatus of claim 1, wherein said instructing means including means for generating a further instruction signal for picking up images enlarged by n times in synchronization with the vertical synchronization signals generated from said synchronizing signal generating means.

3. The image pickup apparatus of claim 1, wherein said horizontal transfer pulse generating means includes, frequency dividing means, operatively connected to said reference pulse generating means and said switching means, for dividing the reference pulse signals by n is response to the enlarging instructing signal from said switching means, and pulse generating means, operatively connected to said frequency dividing means, for generating pulses for horizontal transfer having said n times longer signal periods in response to a divided output from said frequency dividing means.

4. The image pickup apparatus of claim 3, wherein said vertical transfer pulse generating means includes, first counting means, operatively connected to said pulse generating means, for receiving the divided output from the frequency dividing means and for counting the reference pulse signals frequency, divided by n by said frequency dividing means, in synchronization with the horizontal synchronization signals, horizontal timing signal generating means, operatively connected to said first counting means, for decoding a counted output from said first counting means and for generating a plurality of horizontal timing signals with different timings, second counting means, operatively connected to said frequency dividing means, for counting said reference pulse signals frequency divided by n by said frequency dividing means in synchronization with said signals in association with the vertical synchronization signals, vertical timing signal generating means, operatively connected to said second counting means, for decoding a counted output from said second counting means and for generating a plurality of vertical timing signals with different timings, and output means, operatively connected to said vertical and horizontal timing signal generating means, for outputting vertical transfer pulses to said solid state imaging means for said vertical transfer in response to said plurality of horizontal timing signals generated from said horizontal timing signal generating means and in response to the plurality of vertical timing signals generated from said vertical timing signal generating means.

5. The image pickup apparatus of claim 4, wherein said reading pulse generating means includes means, operatively connected to said output means for generating said reading pulses in response to the output means.

6. The image pickup apparatus of claim 1, wherein said high speed vertical transfer pulse generating means includes transfer number setting means for setting the number of unnecessary transfer outputs from the light receiving elements in said vertical direction at an arbitrary selectable number during the two predetermined signal periods in said vertical blanking period.

7. The image pickup apparatus of claim 1, further comprising designating means, operatively connected to the solid state imaging means, for selectively designating an arbitrary portion of the images, picked up by said solid state imaging device, for enlarging.

8. The image pickup apparatus of claim 7, further comprising enlarging position data generating means, operatively connected to said designating means, receiving said selectively designated portion for enlarging and for outputting data indicative of a horizontal position and a vertical position of the portion to be enlarged designated by said designating means, wherein said vertical transfer pulse generating means includes means for defining pulse generating timing of the vertical transfer pulses for said vertical transfer in response to the horizontal position data generated from said enlarging position data generating means, and said high speed vertical transfer pulse generating means includes means for setting the predetermined number of high speed vertical transfer in response to the vertical portion data generated from said enlarging position data generating means.

9. The image pickup apparatus of claim 8, further comprising display means, operatively connected to said enlarging portion data generating means, for displaying a designated portion of the images to be picked up and enlarged in response to the data indicative of the horizontal and vertical positions of the portion to be enlarged, generated from said enlarging position data generating means.

* * * * *